(12) United States Patent
Terakawa et al.

(10) Patent No.: US 7,864,335 B2
(45) Date of Patent: Jan. 4, 2011

(54) METHOD, APPARATUS, AND PROGRAM FOR PROCESSING TOMOGRAPHIC IMAGES, AND OPTICAL TOMOGRAPHY SYSTEM

(75) Inventors: Kensuke Terakawa, Ashigarakami-gun (JP); Wataru Ito, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 296 days.

(21) Appl. No.: 11/941,419

(22) Filed: Nov. 16, 2007

(65) Prior Publication Data
US 2008/0117430 A1 May 22, 2008

(30) Foreign Application Priority Data
Nov. 17, 2006 (JP) ............................. 2006-311288

(51) Int. Cl.
*G01B 9/02* (2006.01)
(52) U.S. Cl. .................................................. 356/497
(58) Field of Classification Search ................ 356/479, 356/497
See application file for complete search history.

(56) References Cited

U.S. PATENT DOCUMENTS 5,956,355 A 9/1999 Swanson et al.

7,372,575 B2 * 5/2008 Fujita ........................ 356/479

FOREIGN PATENT DOCUMENTS

| JP | 2005-283155 A | 10/2005 |
|----|---------------|---------|
| JP | 2006-132996 A | 5/2006 |

OTHER PUBLICATIONS

Yoshiaki Yasuno et al., Three-dimensional and high-speed swept-source optical coherence tomography for in vivo investigation of human anterior eye segments, Optical Society of America, Dec. 26, 2005, pp. 10652-10664, vol. 13, No. 26, Optics Express.

* cited by examiner

*Primary Examiner*—Hwa S. A Lee
(74) *Attorney, Agent, or Firm*—Sughrue Mion, PLLC

(57) ABSTRACT

Deterioration of the resolution of tomographic images obtained by optical tomography measurement is prevented. Interference signals, which are obtained when a light beam L is emitted, are divided into a plurality of divided interference signals each having different wavelength bands. Spectral analysis is administered for each of the plurality of divided interference signals, to obtain a plurality of pieces of intermediate tomographic data. The plurality of pieces of intermediate tomographic data are employed to obtain tomographic data, a tomographic image is generated based on the tomographic data, then displayed.

15 Claims, 14 Drawing Sheets

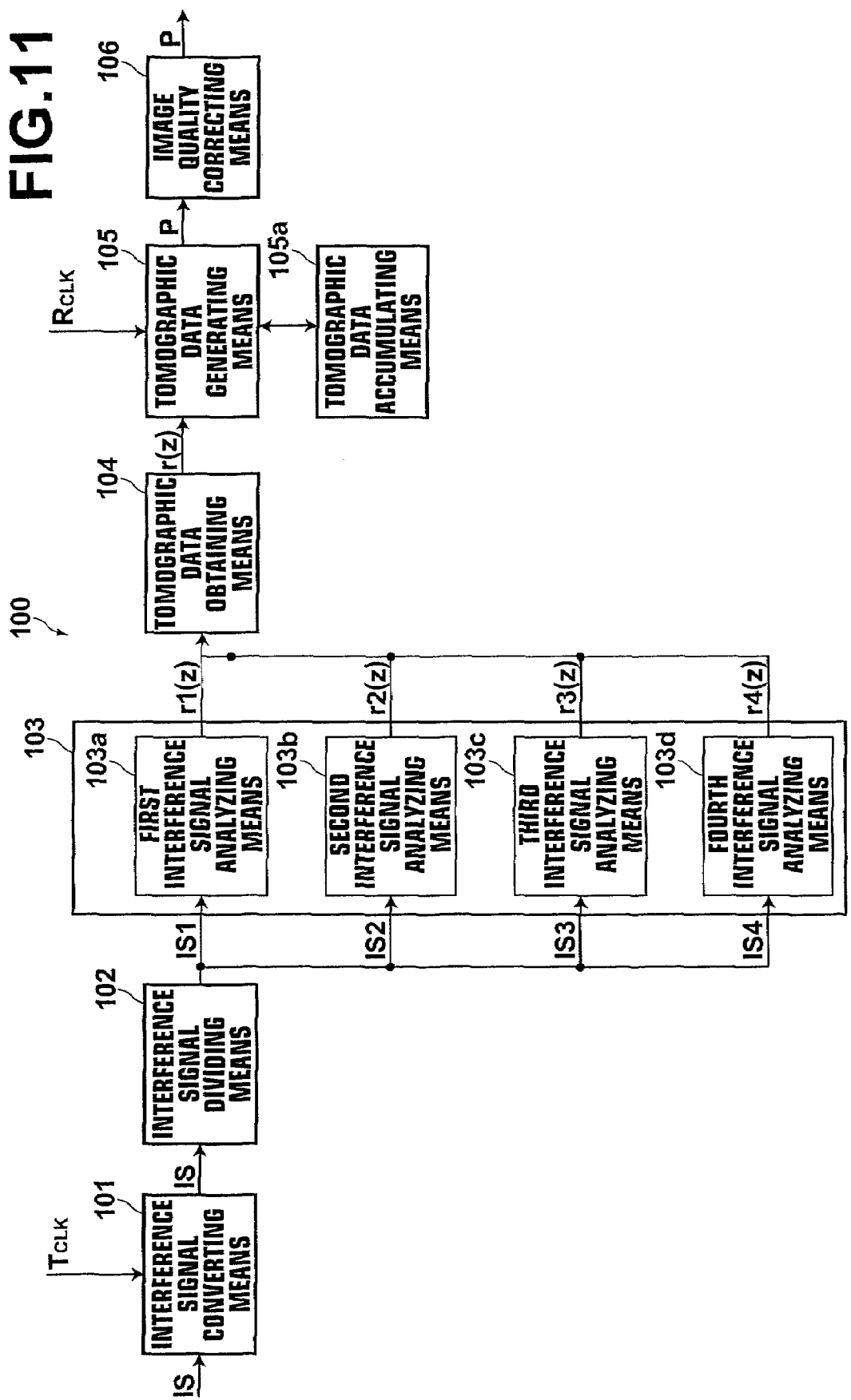

OPTICAL INTENSITY

OPTICAL INTENSITY

OPTICAL INTENSITY

OPTICAL INTENSITY

TOMOGRAPHIC DATA

TOMOGRAPHIC DATA

OPTICAL INTENSITY

OPTICAL INTENSITY

US 7,864,335 B2

METHOD, APPARATUS, AND PROGRAM FOR PROCESSING TOMOGRAPHIC IMAGES, AND OPTICAL TOMOGRAPHY SYSTEM

BACKGROUND OF THE INVENTION

1. Field of the Invention

The present invention relates to a method, apparatus, and program for processing tomographic images, that generates optical tomographic images by OCT (Optical Coherence Tomography) measurement. The present invention also relates to a tomographic imaging system that employs the method, apparatus and program for processing tomographic images.

2. Description of the Related Art

Conventionally, there are cases in which optical tomographs that utilize OCT measurement are employed to generate optical tomographic images of living tissue. In these optical tomographs, a low coherence light beam emitted from a light source is divided in to a measuring light beam and a reference light beam. Thereafter, a reflected light beam, which is the measuring light beam reflected by a measurement target when the measuring light beam is irradiated onto the measurement target, is combined with the reference light beam. Tomographic images are obtained, based on the intensity of a coherent light beam obtained by combining the reflected light beam and the reference light beam. There are some optical tomographs that utilize TD-OCT (Time Domain Optical Coherence Tomography) measurement. In TD-OCT measurement, the measuring position in the depth direction (hereinafter, referred to as "depth position") within a measurement target is changed, by changing the optical path length of the reference light beam.

Recently, OCT apparatuses that generate optical tomographic images at high speeds without changing the optical path length of the reference light beam, by utilizing FD-OCT (Fourier Domain Optical Coherence Tomography) measurement, have been proposed. SD-OCT (Spectral Domain Optical Coherence Tomography) measurement and SS-OCT (Swept Source Optical Coherence Tomography) measurement are two types of FD-OCT measurement (refer to Japanese Unexamined Patent Publication Nos. 2006-132996 and 2005-283155, U.S. Pat. No. 5,956,355, and Y. Yasuno et al., "Three-dimensional and high-speed swept-source optical coherence tomography for in vivo investigation of human anterior eye segments", *OPTICS EXPRESS*, Vol. 13, No. 26, pp. 10652-10664, 2005). In SD-OCT measurement, low coherence light beam having a predetermined wavelength band is divided into a measuring light beam and a reference light beam by a Michelson interferometer, to obtain tomographic images. In SS-OCT measurement, the frequency of a laser beam emitted from a light source is swept. Reflected light beams of each wavelength are caused to interfere with the reference light beam. The intensities of reflected light beams at a depth positions within a measurement target are obtained by administering Fourier analysis on interference spectra for the series of wavelengths. The tomographic images are obtained employing the detected intensities.

In the SS-OCT measurement, the swept wavelengths of the laser beam fluctuate, and therefore the timing for a single period of wavelength sweeping is not always constant. Therefore, performing signal conversion of observed interference signals such that the interference signals are equidistant from each other with respect to wave numbers k has been proposed in U.S. Pat. No. 5,956,355.

It is necessary for the interference signals to be equidistant from each other with respect to wave numbers k, in order to obtain reflection data regarding a predetermined depth position by spectrally analyzing the interference signals. In the case that the interference signals are not arranged equidistantly with respect to the wave numbers k, the resolution of a tomographic image obtained therefrom deteriorates. In order to suppress this deterioration in resolution, the tomograph disclosed in U.S. Pat. No. 5,956,355 stores the wavelength sweeping properties of the light source unit in advance, and rearranges the interference signals such that they become equidistant with respect to the wave numbers k, based on the wavelength sweeping properties.

U.S. Pat. No. 5,956,355 presumes that the swept wavelengths do not change linearly with respect to time, and that the manner of change is reproducible, when rearranging the data string of the interference signals such that they become equidistant with respect to the wave numbers k. However, it is difficult for a light source unit to sweep wavelengths with the same wavelength sweeping properties for every period, and there are cases in which the wavelengths fluctuate for each period, due to the operating environment and the like. In the case that the fluctuation in wavelengths is present, the aforementioned signal conversion is not capable of rearranging the interference signals such that they are equidistant with respect to the wave numbers k, which results in deterioration of the resolution of tomographic images.

SUMMARY OF THE INVENTION

The present invention has been developed in view of the foregoing circumstances. It is an object of the present invention to provide a method, apparatus, and program for processing tomographic images, and also to provide an optical tomography system.

The optical tomographic image processing method of the present invention comprises the steps of:

emitting a light beam within a predetermined wavelength band;

dividing the emitted light beam in to a measuring light beam and a reference light beam;

combining reflected light beams, which are the measuring light beam reflected at various depth positions within a measurement target, with the reference light beam;

detecting interference light beams, formed by combining the reflected light beams and the reference light beam, as interference signals; and generating a tomographic image from the interference signals; wherein:

the detected interference signals are divided into different wavelength bands, to generate a plurality of divided interference signals;

each of the plurality of divided interference signals is analyzed to obtain a plurality of pieces of tomographic data regarding each depth position of the measurement target, as intermediate tomographic data;

tomographic data are obtained employing the plurality of pieces of intermediate tomographic data; and the tomographic image of the measurement target is generated employing the obtained tomographic data.

The optical tomographic image processing apparatus of the present invention emits a light beam within a predetermined wavelength band; divides the emitted light beam in to a measuring light beam and a reference light beam; combines reflected light beams, which are the measuring light beam reflected at various depth positions within a measurement target, with the reference light beam; detects interference light beams, formed by combining the reflected light beams and the reference light beam, as interference signals; and generates tomographic images from the interference signals; and comprises:

interference signal dividing means, for dividing the detected interference signals into different wavelength bands, to generate a plurality of divided interference signals;

interference signal analyzing means, for analyzing each of the plurality of divided interference signals to obtain a plurality of pieces of tomographic data regarding each depth position of the measurement target, as intermediate tomographic data;

tomographic data obtaining means, for obtaining tomographic data employing the plurality of pieces of intermediate tomographic data; and tomographic image generating means, for generating the tomographic images of the measurement target employing the obtained tomographic data.

The optical tomographic image processing program of the present invention causes a computer to execute the procedures of:

emitting a light beam within a predetermined wavelength band;

dividing the emitted light beam in to a measuring light beam and a reference light beam;

combining reflected light beams, which are the measuring light beam reflected at various depth positions within a measurement target, with the reference light beam;

detecting interference light beams, formed by combining the reflected light beams and the reference light beam, as interference signals; and generating a tomographic image from the interference signals; wherein:

the detected interference signals are divided into different wavelength bands, to generate a plurality of divided interference signals;

each of the plurality of divided interference signals is analyzed to obtain a plurality of pieces of tomographic data regarding each depth position of the measurement target, as intermediate tomographic data;

tomographic data are obtained employing the plurality of pieces of intermediate tomographic data; and the tomographic image of the measurement target is generated employing the obtained tomographic data.

The optical tomography system of the present invention comprises:

a light source unit, for emitting a light beam within a predetermined wavelength band;

light dividing means, for dividing the emitted light beam in to a measuring light beam and a reference light beam;

combining means, for combining reflected light beams, which are the measuring light beam reflected at various depth positions within a measurement target, with the reference light beam;

interference light detecting means, for detecting interference light beams, formed by combining the reflected light beams and the reference light beam, as interference signals; and tomographic data processing means, for generating a tomographic image from the interference signals; wherein the tomographic data processing means comprises:

interference signal dividing means, for dividing the detected interference signals into different wavelength bands, to generate a plurality of divided interference signals;

interference signal analyzing means, for analyzing each of the plurality of divided interference signals to obtain a plurality of pieces of tomographic data regarding each depth position of the measurement target, as intermediate tomographic data;

tomographic data obtaining means, for obtaining tomographic data employing the plurality of pieces of intermediate tomographic data; and tomographic image generating means, for generating the tomographic images of the measurement target employing the obtained tomographic data.

Here, the "reflected light beam" refers to back scattered light, as well as the measuring light beam reflected by the measurement target.

The interference signal analyzing means may employ any method to obtain tomographic data regarding each depth position of the measurement target from the interference signals. Examples of methods that may be employed to obtain the tomographic data include spectral analyzing methods, such as the Fourier transform processing method, the maximum entropy method, and the Yule-Walker method.

The interference signal dividing means may divide the interference signals such that the wavelength bandwidths of each divided interference signal are substantially uniform, or such that the wavelength bandwidths of each divided interference signal are different.

Further, the interference signal dividing means may divide the interference signals such that the wavelength bands of the divided interference signals overlap, or such that the wavelength bands of the divided interference signals do not overlap.

The tomographic data obtaining means may employ any method to obtain tomographic data employing the plurality of pieces of intermediate tomographic data. Calculating an average value of the plurality of intermediate tomographic data is an example of a method that may be employed. Calculating an average value of the plurality of intermediate tomographic data; excluding the intermediate tomographic data having the furthest value from the average value; and recalculating an average value of the remaining intermediate tomographic data is another example. Calculating an average value of the plurality of intermediate tomographic data; and weighting each piece of the intermediate tomographic data such that the weighting is greater the closer the value of the intermediate tomographic data is to the average value is yet another example. Calculating an average value and a variance of the plurality of intermediate tomographic data; extracting intermediate tomographic data having a difference from the average value smaller than the variance; and employing the extracted tomographic data is still yet another example.

The tomographic image processing apparatus of the present invention may further comprise:

interference signal converting means, for converting the interference signals or the divided interference signals so as to correspond to changes in wave numbers, when the wavelength of the light beam is swept. In this case, the interference signal analyzing means obtains the plurality of pieces of intermediate tomographic data regarding each depth position of the measurement target, by analyzing the interference signals converted by the interference signal converting means. Note that the interference signal dividing means may generate the divided interference signals by dividing the interference signals which have been converted by the interference signal converting means. Alternatively, the interference signal dividing means may divide the interference signals first, then the interference signal converting means may convert the divided interference signals.

Note that the light source unit may be that which emits light while sweeping the wavelength thereof within a predetermined wavelength band. That is, the optical tomographic image processing apparatus and the optical tomography system of the present invention may obtain tomographic images by SS-OCT measurement. In this case, the interference signal dividing means generates the plurality of divided interference signals, by dividing the interference signals, which are detected during a single period of the wavelength of the light beam being swept, into the divided interference signals for each of a plurality of different wavelength bands. Alternatively, the light source unit may be that which periodically emits a low coherence light beam having the predetermined wavelength band. That is, the optical tomographic image processing apparatus and the optical tomography system of the present invention may obtain tomographic images by SD-OCT measurement. In this case, the interference signal dividing means generates the plurality of divided interference signals, by dividing the interference signals, which are detected during a single period of the light beam being emitted, into the divided interference signals for each of a plurality of different wavelength bands.

The optical tomographic image processing method, the optical tomographic image processing apparatus and the optical tomography system perform the steps of: emitting a light beam within a predetermined wavelength band; dividing the emitted light beam in to a measuring light beam and a reference light beam; combining reflected light beams, which are the measuring light beam reflected at various depth positions within a measurement target, with the reference light beam; detecting interference light beams, formed by combining the reflected light beams and the reference light beam, as interference signals; and generating a tomographic image from the interference signals. The interference signals, which are detected when the light beam is emitted, are divided into different wavelength bands, to generate a plurality of divided interference signals; each of the plurality of divided interference signals is analyzed to obtain a plurality of pieces of tomographic data regarding each depth position of the measurement target, as intermediate tomographic data; tomographic data are obtained employing the plurality of pieces of intermediate tomographic data; and the tomographic image of the measurement target is generated employing the obtained tomographic data. Thereby, the influence of fluctuations in the wavelength of the emitted light beam can be minimized by obtaining the tomographic data employing the plurality of intermediate tomographic data, even in the case that the fluctuations occur and the wavelength band of the actual emitted light beam is shifted from the expected wavelength band of the interference signals during the tomographic image generating step. Accordingly, the resolution of the tomographic image can be improved.

The interference signal dividing means may divide the interference signals such that the wavelength bandwidths of each divided interference signal are substantially uniform. In this case, the same algorithm may be employed to analyze each of the divided interference signals, and the analysis of the divided interference signals can be performed efficiently.

Further, the interference signal dividing means may divide the interference signals such that the wavelength bands of the divided interference signals overlap. In this case, the occurrence of wavelength bands which are not analyzed can be prevented, thereby improving the resolution of the generated tomographic image.

The tomographic data obtaining means may obtain the tomographic data by calculating an average value of the plurality of pieces of intermediate tomographic data. In this case, noise components and the like, which are included in each of the divided interference signals, can be cancelled out, to improve the resolution of the generated tomographic image.

Alternatively, the tomographic data obtaining means may obtain the tomographic data by: calculating an average value of the plurality of intermediate tomographic data; excluding the intermediate tomographic data having the furthest value from the average value; and recalculating an average value of the remaining intermediate tomographic data. As another alternative, the tomographic data obtaining means may obtain the tomographic data by: calculating an average value of the plurality of intermediate tomographic data; and weighting each piece of the intermediate tomographic data such that the weighting is greater the closer the value of the intermediate tomographic data is to the average value. In these cases as well, noise components and the like, which are included in each of the divided interference signals, can be cancelled out, and the resolution of the generated tomographic image can be improved. Particularly in the case that a divided interference signal corresponding to a specific wavelength band includes a large noise component, the intermediate tomographic data that includes the large noise component can be excluded when obtaining the tomographic data. Thereby, the resolution of the generated tomographic image can be improved further.

The tomographic image processing apparatus of the present invention may further comprise: the interference signal converting means, for converting the interference signals or the divided interference signals so as to correspond to changes in wave numbers, when the wavelength of the light beam is swept. In this case, when conversion is performed into interference signals corresponding to changes in wave numbers for spectral analysis, the conversion can be performed based on the wavelength sweeping properties of the light source unit. Accordingly, the resolution of the generated tomographic image can be improved.

Note that the light beam may be emitted while the wavelength thereof is swept within a predetermined wavelength band, and the interference signal dividing means may generate the plurality of divided interference signals, by dividing the interference signals, which are detected during a single period of the wavelength of the light beam being swept, into the divided interference signals for each of a plurality of different wavelength bands. That is, the optical tomographic image processing apparatus and the optical tomography system of the present invention may obtain tomographic images by SS-OCT measurement. The aforementioned improvements in resolution can be achieved in this case as well.

Alternatively, the light beam may be periodically emitted as a low coherence light beam having the predetermined wavelength band, and the interference signal dividing means may generate the plurality of divided interference signals, by dividing the interference signals, which are detected during a single period of the light beam being emitted, into the divided interference signals for each of a plurality of different wavelength bands. That is, the optical tomographic image processing apparatus and the optical tomography system of the present invention may obtain tomographic images by SD-OCT measurement. The aforementioned improvements in resolution can be achieved in this case as well.

Note that the tomographic image processing program of the present invention maybe provided being recorded on computer readable media. Those who are skilled in the art would know that computer readable media are not limited to any specific type of device, and include, but are not limited to: floppy disks; RAM's; ROM's; CD's; magnetic tapes; hard disks; and internet downloads, by which computer instructions may be transmitted. Transmission of the computer instructions through a network or through wireless transmission means is also within the scope of the present invention. In addition, the computer instructions may be in the form of object, source, or executable code, and may be written in any language, including higher level languages, assembly language, and machine language.

BRIEF DESCRIPTION OF THE DRAWINGS

FIG. 11 is a block diagram that illustrates an example of a tomographic image processing means of FIG. 1.

BEST MODE FOR CARRYING OUT THE INVENTION

Figure 1:
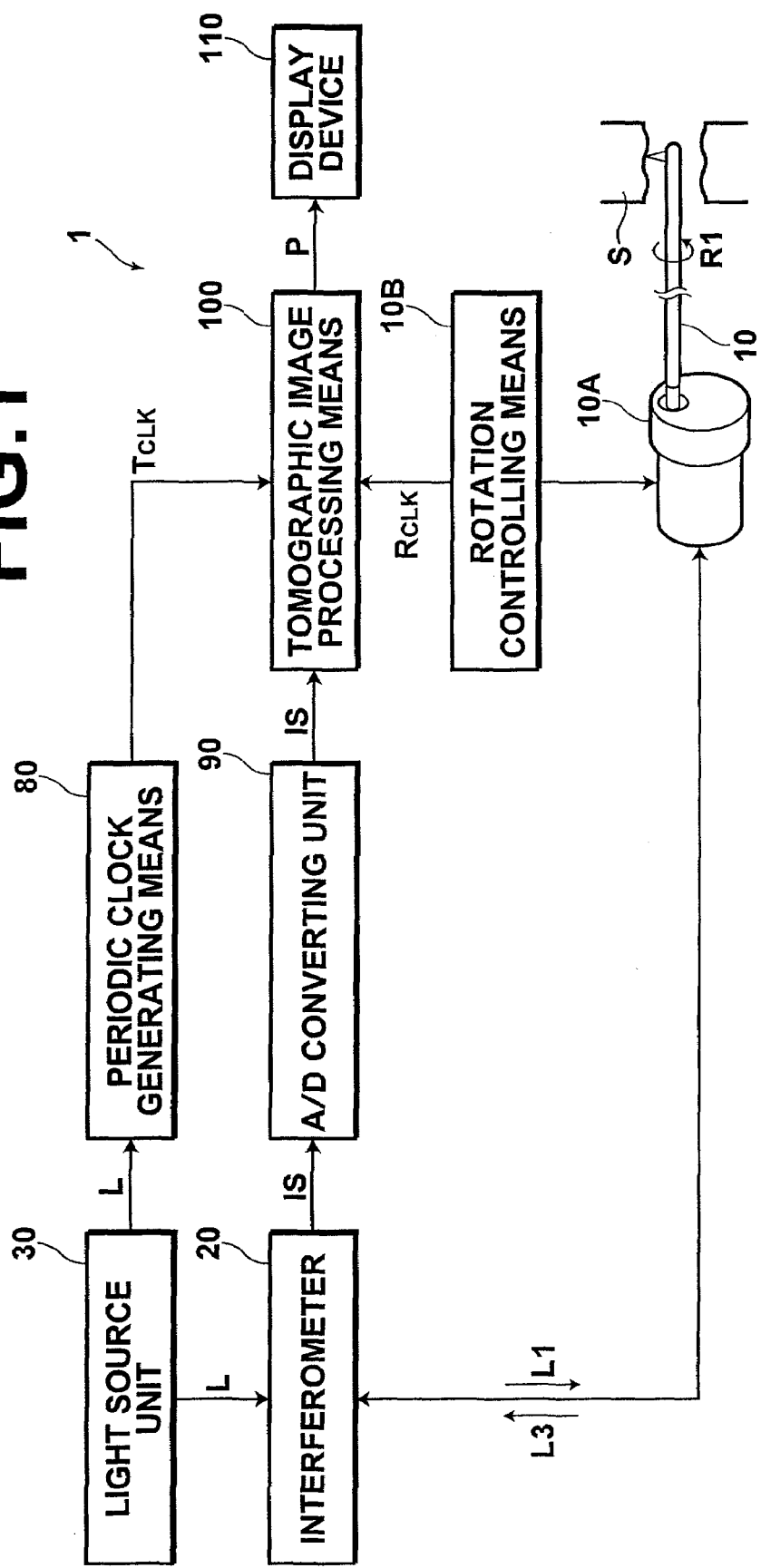
FIG. 1 is a diagram that illustrates the schematic construction of an optical tomography system according to a preferred embodiment of the present invention.

Hereinafter, an embodiment of the optical tomography system according to the present invention will be described in detail, with reference to the attached drawings. FIG. 1 is a diagram that illustrates the schematic construction of an optical tomography system 1 according to a preferred embodiment of the present invention. The optical tomography system 1 obtains tomographic images of measurement targets S, which are living tissue, cells, and the like within body cavities, using SS-OCT (Swept Source Optical Coherence Tomography) by inserting an optical probe 10 within body cavities. The optical tomography system 1 comprises: the optical probe 10; an interferometer 20; a light source unit 30; a periodic clock generating means 80; an A/D converting unit 90; a tomographic image processing means 100; and a display device 110.

Figure 2:
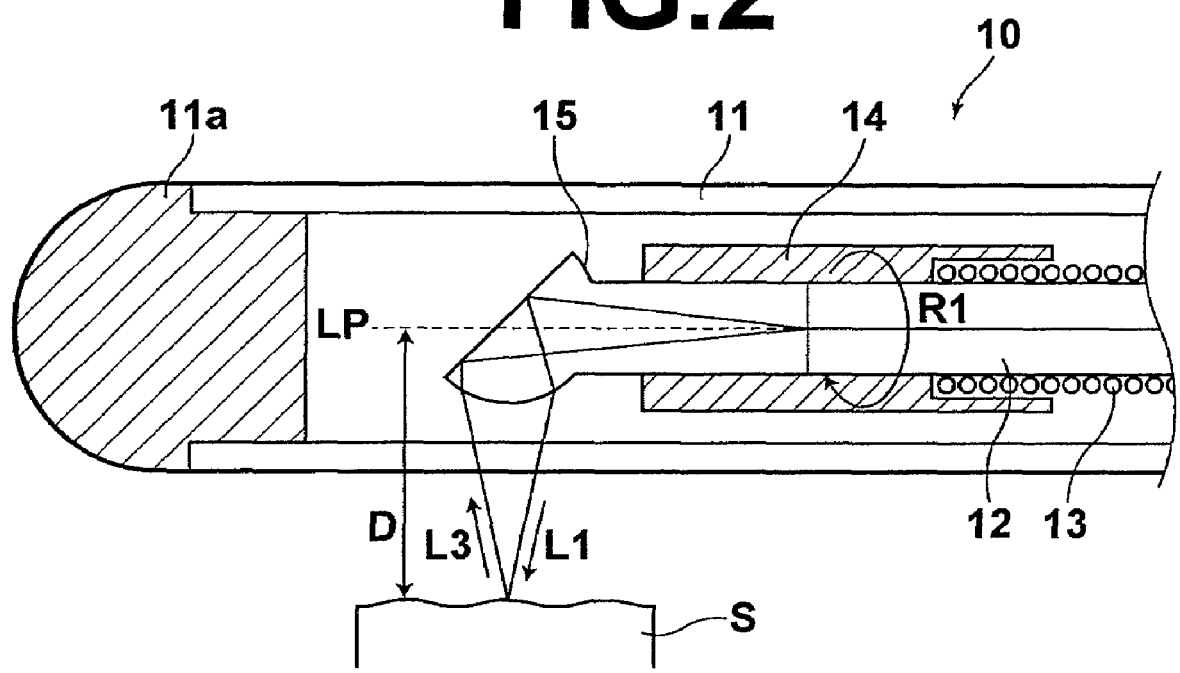
FIG. 2 is a schematic diagram that illustrates an example of the tip of an optical probe utilized in the optical tomography system of FIG. 1.

FIG. 2 is a schematic diagram that illustrates an example of the tip of the optical probe 10. The optical probe 10 of FIG. 2 is to be inserted into body cavities via a forceps opening and a forceps channel, and comprises: a probe outer cylinder 11 (sheath); an optical fiber 12; and an optical lens 15. The probe outer cylinder 11 is constituted by a cylindrical member having plasticity, which is made from a material that transmits a measuring light beam L1 and a reflected light beam L3. Note that the tip of the probe outer cylinder 11 is sealed by a cap 11a.

The optical fiber 12 is provided within the probe outer cylinder 11, and guides the measuring light beam L1 emitted from the interferometer 20 to the measurement target S. The optical fiber 12 also guides the reflected light beam L3 (back scattered light), which is the measuring light beam L1 reflected by the measurement target S, back to the interferometer 20. A spring 13 is fixed about the outer periphery of the optical fiber 12, and the spring 13 and the optical fiber 12 are mechanically linked to a rotational driving unit 10A. The optical fiber 12 and the spring 13 are configured to be rotated by the rotational driving unit 10A with respect to the probe outer cylinder 11 in the direction indicated by arrow R1. Note that the rotational driving unit 10A is equipped with a rotational encoder (not shown), and a rotation controlling means 10B is configured to recognize the position onto which the measuring light beam L1 is irradiated based on signals from the rotational encoder.

The optical lens 15 is of a substantially spherical shape, in order to focus the measuring light beam L1 emitted from the optical fiber 12 on the measurement target S. The optical lens 15 also focuses the reflected light beam L3 reflected by the measurement target S, and causes the focused reflected light beam L3 to enter the optical fiber 12. Here, the focal distance of the optical lens 15 is set to at a distance D=3 mm from the optical axis LP of the optical fiber 12 in the radial direction of the probe outer cylinder 11. The optical lens 15 is fixed to the light emitting end of the optical fiber 12 by a fixing member 14, such that when the optical fiber 12 rotates in the direction R1, the optical lens 15 rotates integrally therewith. Thereby, the optical probe 10 is capable of irradiating the measurement target S with the measurement light beam L1 emitted from the optical lens 15 while scanning the measuring light beam L1 in the direction indicated by arrow R1 (the circumferential direction of the probe outer cylinder 11).

The operation of the rotational driving unit 10A that rotates the optical fiber 12 and the optical lens 15 of FIG. 1 is controlled by the rotation controlling means 10B. The rotation controlling means 10B exerts control such that the optical fiber 12 and the optical lens 15 rotate in the direction R1 with respect to the probe outer cylinder 11 at approximately 20 Hz, for example. The rotation controlling means 10B is configured to output a rotational clock signal $R_{CLK}$ to the tomographic image processing means 100, each time that it is judged that the optical fiber 12 has been rotated one full rotation, based on the signal from the rotational encoder of the rotational driving unit 10A.

Figure 3:
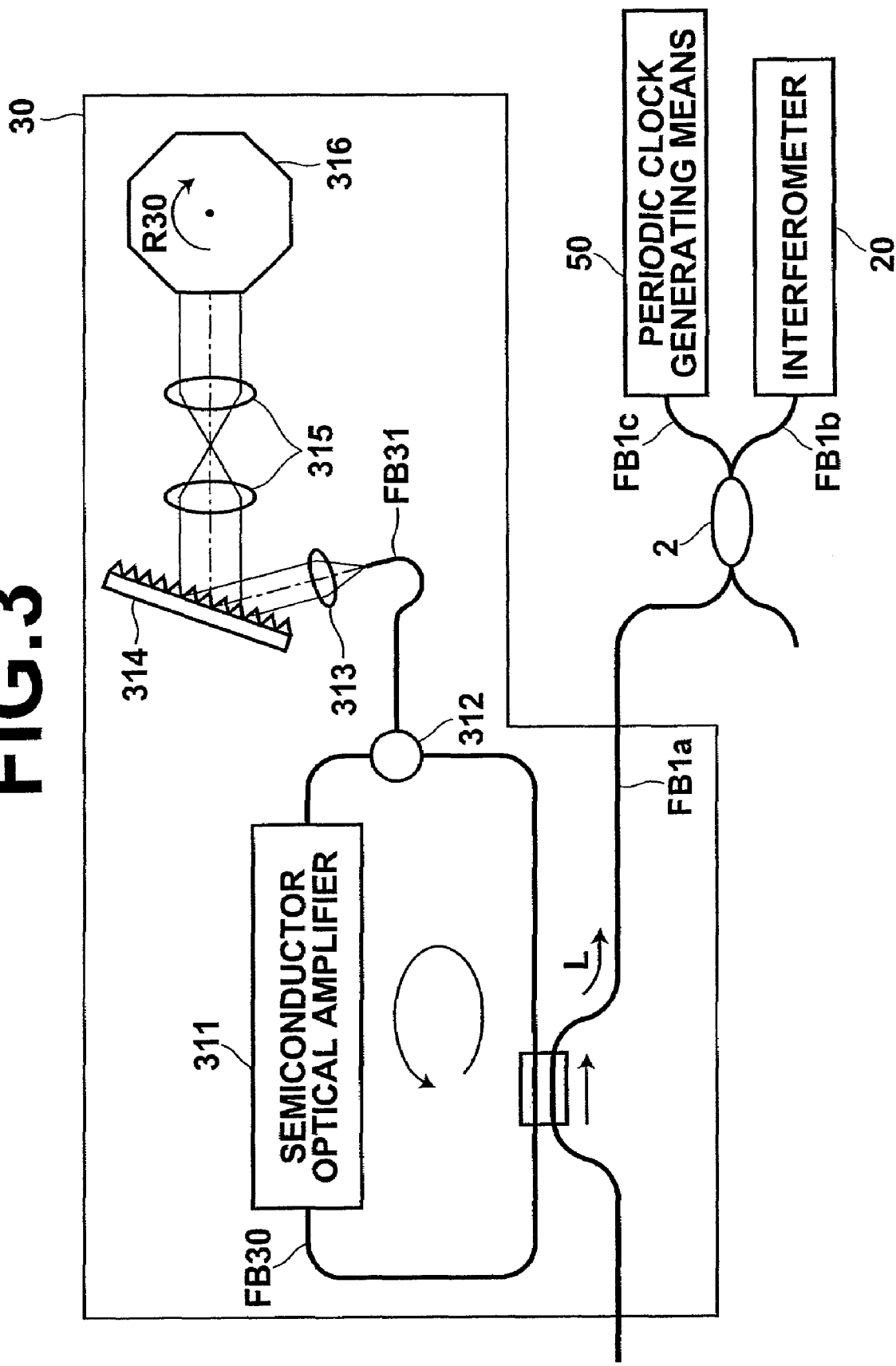
FIG. 3 is a diagram that illustrates an example of the schematic construction of a light source unit utilized in the optical tomography system of FIG. 1.

FIG. 3 is a diagram that illustrates an example of the schematic construction of the light source unit 30. The light source unit 30 emits a laser beam L while sweeping the wavelength thereof at a period $T_O$. Specifically, the light source unit 30 comprises: a semiconductor optical amplifier 311 (semiconductor gain medium); and an optical fiber FB30. The optical fiber FB30 is connected to both ends of the semiconductor optical amplifier 311. The semiconductor optical amplifier 311 functions to emit a slight amount of light into a first end of the optical fiber FB30, when a drive current is injected thereinto, and to amplify the light that enters it from a second end of the optical fiber FB30. When the drive current is supplied to the semiconductor optical amplifier 311, the laser beam L is emitted into the optical fiber FB30 as a pulsed laser beam, from an optical resonator formed by the semiconductor optical amplifier 311 and the optical fiber FB30.

Further, an optical divider 312 is linked to the optical fiber FB30, and a portion of the light beam that propagates within the optical fiber FB30 is emitted from the optical divider 312 into an optical fiber FB31. The light beam, which is emitted from the optical finer FB31, passes through a collimating lens 313, a diffraction grating 314, and an optical system 315, to be reflected by a rotating polygon mirror 316. The light reflected by the rotating polygon mirror 316 passes through the optical system 315, the diffraction grating 314, and the collimating lens 313, to reenter the optical fiber FB31.

The rotating polygon mirror 316 rotates in the direction indicated by arrow R30, to vary the angle of each reflective surface thereof with respect to the optical axis of the optical system 315. Thereby, only a light beam having a specific wavelength band, from among the light spectrally decomposed by the diffraction grating 314, is returned to the optical fiber FB31. The wavelength of the light beam that reenters the optical fiber FB31 is determined by the angle formed by the optical axis of the optical system 315 and the reflective surface of the rotating polygon mirror 316. The light beam that reenters the optical fiber FB31 is caused to enter the optical fiber FB30 by the optical divider 312. As a result, the laser beam L having the specific wavelength is emitted toward an optical fiber FB1a.

Figure 4:
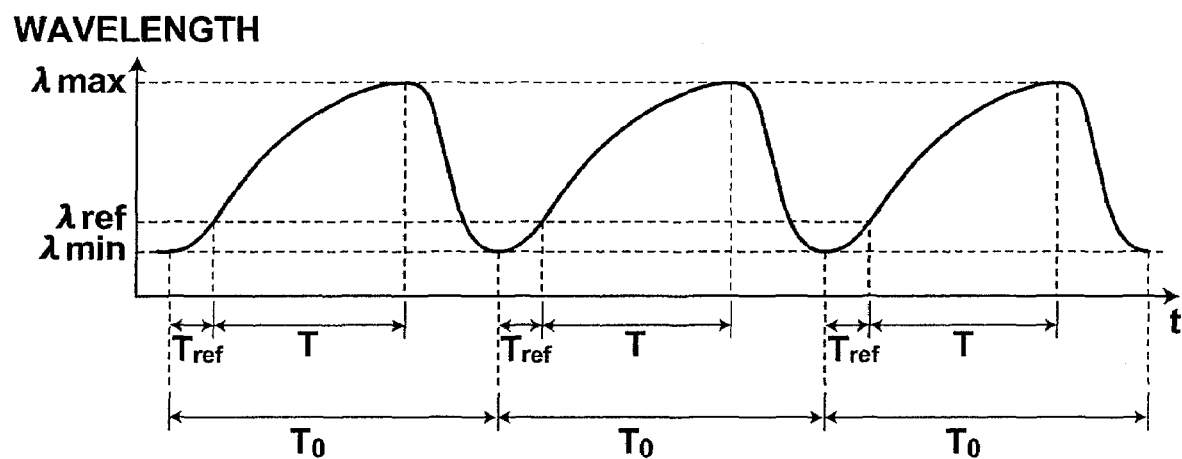
FIG. 4 is a graph that illustrates the manner in which the wavelength of a light beam emitted from the light source unit of FIG. 3 is swept.

Accordingly, when the rotating polygon mirror 316 is rotated in the direction of arrow R30 at a constant speed, the wavelength λ of the light beam that enters the optical fiber FB1a is varied over time, at a constant period. Specifically, the light source unit 30 emits the laser beam L, of which the wavelength is swept from a minimum wavelength λmin to a maximum wavelength λmax at the period $T_O$ (approximately 50 μsec, for example), as illustrated in FIG. 4. The laser beam L emitted from the light source unit 30 is divided and guided into an optical fiber FB1b and an optical fiber FB1c by a light dividing means 2 constituted by an optical fiber coupler or the like. The divided light beams enter the interferometer 20 and the periodic clock generating means 80, respectively.

Note that although a case in which the light source unit 30 rotates the polygon mirror to sweep the frequency of the laser beam L has been described, the present invention is not limited to this configuration. Alternatively, other known light source units, such as an ASE light source unit, may be employed to emit the laser beam L while sweeping the frequency thereof.

Figure 5:
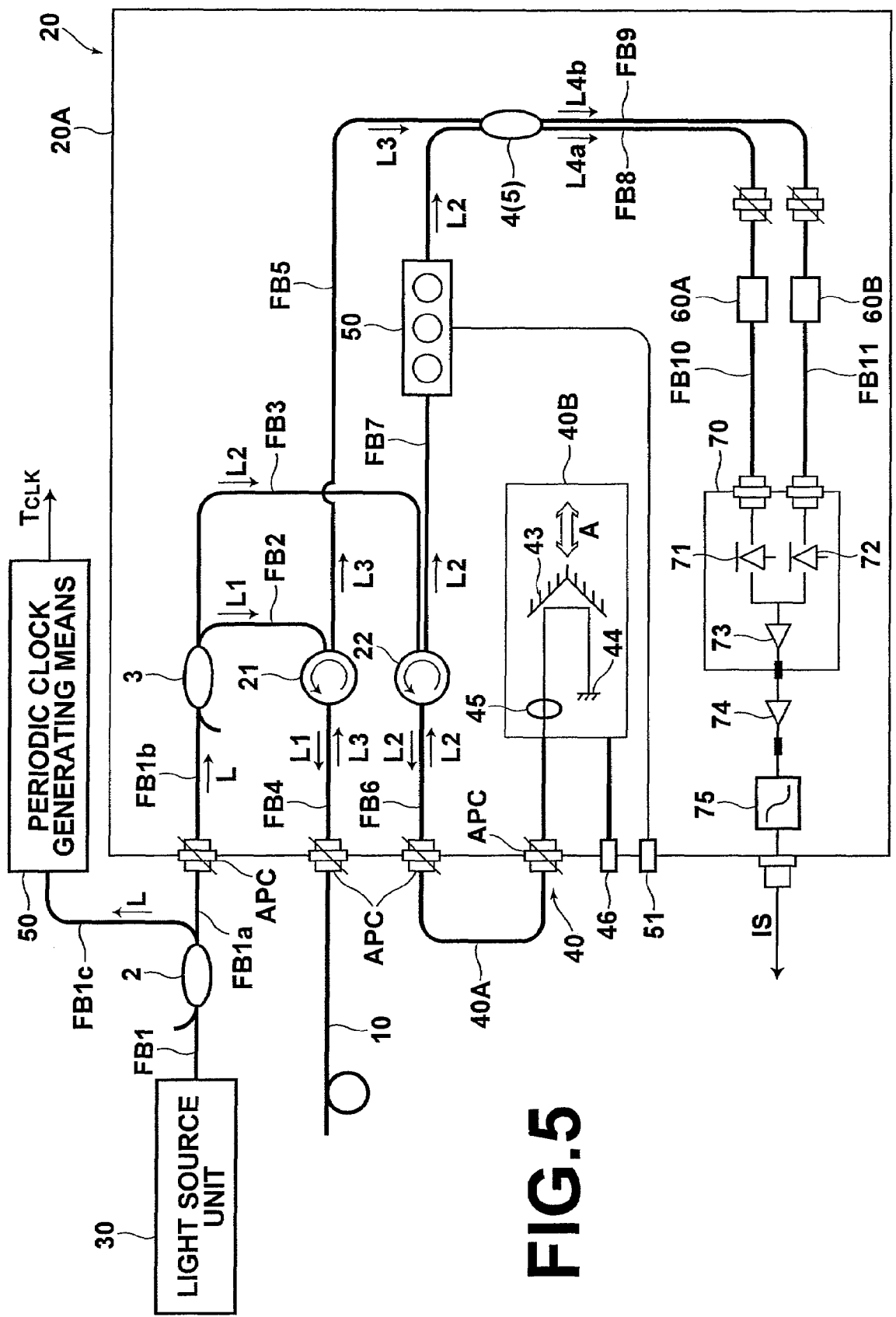
FIG. 5 is a diagram that illustrates the schematic construction of an example of an interferometer of the optical tomography system of FIG. 1.

FIG. 5 is a diagram that illustrates the schematic construction of an example of the interferometer 20 of the optical tomography system 1 of FIG. 1. The interferometer 20 is a Mach-Zehnder type interferometer, and is constructed by various types of optical components housed within a case 20A. The interferometer 20 comprises: a light dividing means 3, for dividing the laser beam L emitted from the light source unit 30 into the measuring light beam L1 and a reference light beam L2; a combining means 4, for combining the reflected light beam L3, which is the measuring light beam L1 reflected by the measurement target S, and the reference light beam L2; and an interference light detecting means, for detecting an interference light beam L4 formed by combining the reflected light beam L3 and the reference light beam L2. Note that the interferometer 20 and the light source unit 30 are connected using an APC (Angled Physical Contact) connector. By using the APC connector, the amount of light which is reflected by the connecting surface of the connector (optical fiber) is reduced to an absolute minimum, thereby preventing deterioration of image quality of tomographic images P.

The light dividing means 3 is constituted by a 2×2 optical fiber coupler, for example. The light dividing means 3 functions to divide the laser beam L, which emitted by the light source unit 30 and guided through the optical fiber FB1c, into the measuring light beam L1 and the reference light beam L2. The division ratio of the light dividing means 3 is measuring light beam L1:reference light beam L2=99:1, for example. The light dividing means 3 is optically connected to optical fibers FB2 and FB3. The measuring light beam L1 enters the optical fiber FB2, and the reference light beam L2 enters the optical fiber FB3.

An optical circulator 21 is connected to the optical fiber FB2, and optical fibers FB4 and FB5 are connected to the optical circulator 21. The optical fiber FB4 is connected to the optical probe 10 that guides the measuring light beam L1 to the measurement target S. The measurement light beam L1 emitted from the light source unit 30 is guided through the optical fiber FB2 to the optical circulator 21, then guided to the optical probe 10 by the optical fiber FB4. The reflected light beam L3, which is reflected by the measurement target S, enters the optical circulator 21 via the optical fiber FB4, then enters the optical fiber FB5 from the optical circulator 21. Note that the optical fiber FB4 and the optical probe 10 are connected by an APC connector. Thereby, the amount of light which is reflected by the connecting surface of the connector (optical fiber) is reduced to an absolute minimum, and deterioration of image quality of the tomographic images P is prevented.

Meanwhile, an optical circulator 22 is connected to the optical fiber FB3, and optical fibers FB6 and FB7 are connected to the optical circulator 22. An optical path length adjusting means 40, for changing the optical path length of the reference light beam L2 in order to adjust the region at which tomographic images are obtained, is connected to the optical fiber FB6. The optical path length adjusting means 40 comprises: a coarse adjusting optical fiber 40A, for coarsely adjusting the optical path length; and a fine adjusting means 40B, for finely adjusting the optical path length.

One end of the coarse adjusting optical fiber 40A is detachably connected to the optical fiber FB6, and the other end thereof is detachably connected to the fine adjusting means 40B. A plurality of coarse adjusting optical fibers 40A of different lengths are prepared in advance, and an appropriate coarse adjusting optical fiber 40A is mounted, as necessary. Note that the coarse adjusting optical fiber 40A is connected to the optical fiber FB6 and the fine adjusting means 40B via APC connectors. Thereby, the amount of light which is reflected by the connecting surface of the connector (optical fiber) is reduced to an absolute minimum, and deterioration of image quality of the tomographic images P is prevented.

The fine adjusting means 40B comprises: a mirror 43; and an optical terminator 44. The mirror 43 reflects the reference light beam L2 emitted from the coarse adjusting optical fiber 40A, and reflects the reference light beam L2 reflected by the optical terminator 44 back toward the coarse adjusting optical fiber 40A. The mirror 43 is fixed on a movable stage (not shown). The mirror 43 is moved in the direction of the optical axis of the reference light beam L2 (the direction indicated by arrow A) by moving the movable stage, and thereby the optical path length of the reference light beam L2 is changed. The movement of the movable stage is performed by a user, such as a physician, operating an optical path length adjusting section 46.

Further, a polarization controller 50 is optically connected to the optical fiber FB7. The polarization controller 50 functions to rotate the polarization direction of the reference light beam L2. Note that a known polarization controller, such as that disclosed in Japanese Unexamined Patent Publication No. 2001-264246 may be employed as the polarization controller 50. The polarization controller 50 is configured to adjust the polarization direction when a user, such as a physician, operates a polarization adjusting section 51. For example, adjustments can be made such that the polarization directions of the reflected light beam L3 and the reference light beam L2 are combined by the combining means 4, in order to obtain clearer tomographic images.

The combining means 4 is constituted by a 2×2 optical fiber coupler. The combining means 4 combines the reflected light beam L3 guided by the optical fiber FB5 and the reference light beam L2 guided by the optical fiber FB7. Specifically, the combining means 4 divides the reflected light beam L3, which is guided by the optical fiber FB5, so that it enters optical fibers FB8 and FB9, and also divides the reference light beam L2, which is guided by the optical fiber FB7, so that it also enters the optical fibers FB8 and FB9. Accordingly, a first interference light beam L4a propagates through the optical fiber FB8, and a second interference light beam L4b propagates through the optical fiber FB9. That is, the combining means 4 also functions as a light dividing means that divides the interference light beam L4 formed by the reference light beam L2 and the reflected light beam L3 into two interference light beams L4a and L4b.

The interference light detecting means 70 comprises: a first photodetecting section 71, for detecting the first interference light beam L4a; a second photodetecting section 72, for detecting the second interference light beam L4b; and a differential amplifier 73 that outputs the difference between the first interference light beam L4a detected by the first photodetecting section 71 and the second interference light beam L4b detected by the second photodetecting section 72, as an interference signal IS. Each of the photodetecting sections 71 and 72 are constituted by photodiodes, for example. The photodetecting sections 71 and 72 photoelectrically convert the interference light beams L4a and L4b, which are input thereto via variable optical attenuators 60A and 60B, and output the electric charges to the differential amplifier 73. The differential amplifier 73 amplifies the difference between the first interference light beam L4a and the second interference light beam L4b, and outputs the amplified difference as the interference signal IS. By performing balanced detection of each of the interference light beams L4a and L4b, same phase optical noise other than the interference signal IS can be removed while amplifying the interference signal IS, and therefore the image quality of the tomographic images P can be improved.

The variable optical attenuators 60A and 60B are provided between a light dividing means 5 (the combining means 4) and the interference light detecting means 70. The variable optical attenuators 60A and 60B respectively attenuate the light intensity of the interference light beams L4a and L4b with different attenuation rates for each wavelength band, before the interference light beams L4a and L4b enter the interference light detecting means 70.

Figure 6:
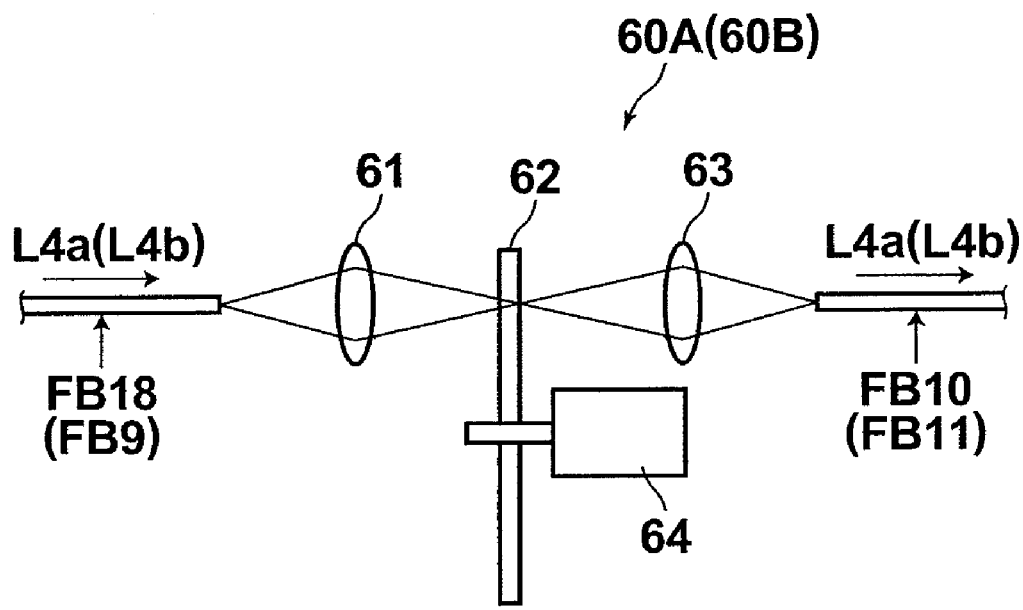
FIG. 6 is a diagram that illustrates the schematic construction of an example of a variable optical attenuator of the interferometer of FIG. 5.
Figure 7:
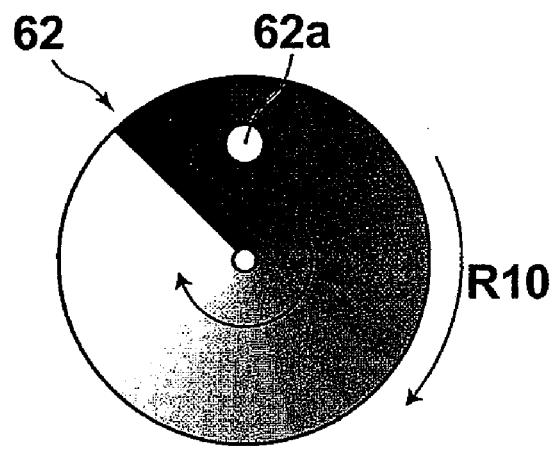
FIG. 7 is a diagram that illustrates the schematic construction of an example of a light attenuating filter of the variable optical attenuator of FIG. 6.

FIG. 6 is a diagram that illustrates the schematic construction of an example of the variable optical attenuator 60A. The variable optical attenuator 60A comprises: a discoid light attenuating filter 62 (ND filter) and a drive means 64 for causing the light attenuating filter 62 to rotate about the central axis thereof. The light attenuating filter 62 has different densities of black color along the circumferential direction thereof, that is, the direction of arrow R10 in FIG. 7 for example, to have different attenuation rates (transmittance). The interference light beam L4a is caused to enter a spot 62a of the light attenuating filter 62, and is attenuated according to the attenuation rate (transmittance) at the spot 62a. Accordingly, when the attenuating filter 62 is caused to rotate by the drive means 64, the attenuation rate of the spot of the filter at which the interference light beam L4a is transmitted changes over time. Note that the variable optical attenuator 60b is of the same construction as the variable optical attenuator 60A. The attenuation rates imparted by the variable optical attenuators 60A and 60B are set such that the intensity levels of the interference light beams L4a and L4b, which are detected by photodetecting sections 71 and 72 become substantially uniform in each wavelength band.

Accordingly, when the interference light beams L4a and L4b, which have wavelengths that vary over time, enter the variable optical attenuators 60A and 60B, the variable optical attenuators 60A and 60B attenuate the interference light beams L4a and L4b while varying the attenuation rate to match the wavelength variation thereof. Thereby, the intensity levels of the interference light beams L4a and L4b, which are detected by the photodetecting sections 71 and 72 of the interference light detecting means 70, become substantially uniform. Accordingly, the S/N ratio during balanced detection by the interference light detecting means 70 can be improved.

Note that FIG. 5 illustrates an example in which the variable optical attenuators 60A and 60B are provided. However, in the case that the optical intensity balance between the photodetecting sections 71 and 72 is substantially uniform across all wavelength bands without providing the variable optical attenuators 60A and 60B, they may be omitted.

In addition, in the description above, a case was described in which the division ratio at the light dividing means 5 is different for each wavelength band, and the attenuation rate of the variable optical attenuators 60A and 60B are changed for each wavelength band. However, in the case that the optical intensity properties of the interference light beams L4a and L4b detected by the photodetecting sections 71 and 72 are substantially uniform across all wavelength bands, it is not necessary to vary the attenuation rates. In this case, an attenuator having a uniform attenuation rate suitable for these properties may be employed.

In addition, the interference signal IS output from the interference light detecting means 70 is amplified by an amplifier 74, then output to the A/D converting unit 90 via a signal band filter 75. The signal band filter 75 is provided to remove noise from the interference signal IS, thereby improving the S/N ratio thereof.

Figure 8:
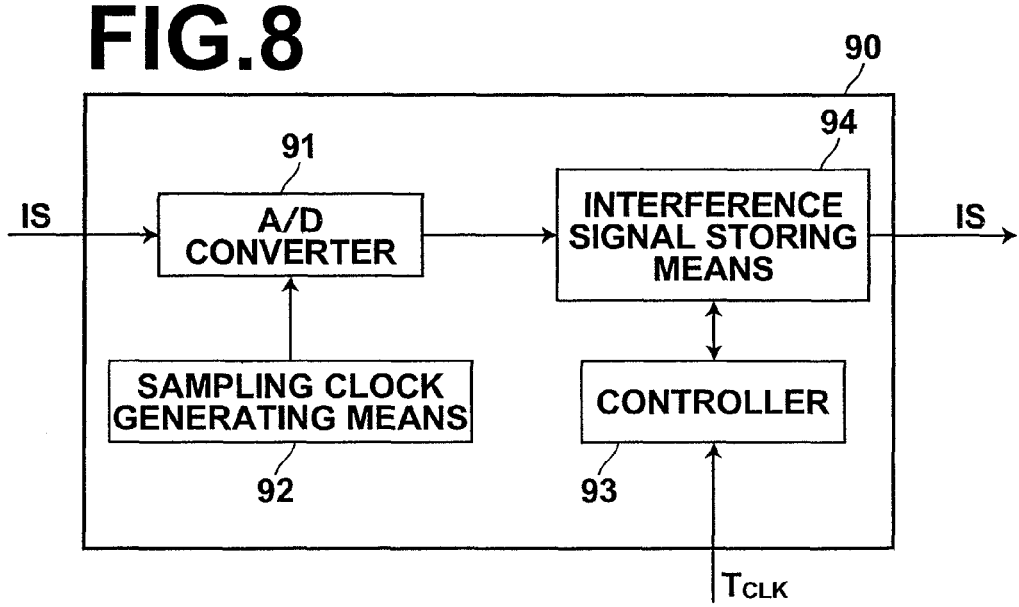
FIG. 8 is a block diagram that illustrates an example of an A/D converting unit of the optical tomography system of FIG. 1.

FIG. 8 is a block diagram that illustrates an example of the A/D converting unit 90 illustrated in FIG. 1. The A/D converting unit 90 converts the interference signals IS detected by the interference light detecting means 70 into digital signals, and outputs the digital signals. The A/D converting unit 90 comprises: an A/D converter 91; a sampling clock generating circuit 92; a controller 93; and an interference signal storing means 94. The A/D converter 91 converts the interference signals IS, which are output from the interferometer 20 as analog signals, into digital signals. The A/D converter 91 performs A/D conversion based on sampling clock signals output from the sampling clock generating circuit 92. The interference signal storing means 94 is constituted by a RAM (Random Access Memory), for example, and temporarily stores the digitized interference signals IS therein. The operations of the A/D converter 91, the sampling clock generating circuit 92, and the interference signal storing means 94 are controlled by the controller 93.

Here, the interference signals IS stored in the interference signal storing means 94 are obtained for a single period, using a timing that a periodic clock signal $T_{CLK}$ is output to an interference signal converting means 101 (refer to FIG. 11) as a reference.

Figure 9:
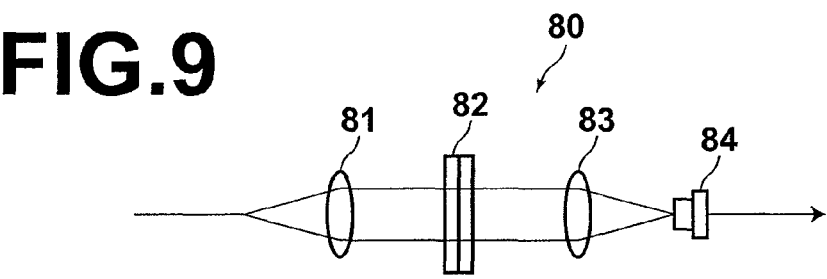
FIG. 9 is a diagram that illustrates the schematic construction of an example of a periodic clock generating means of the optical tomography system of FIG. 1.

FIG. 9 is a diagram that illustrates the schematic construction of an example of the periodic clock generating means 80 that generates the periodic clock signal $T_{CLK}$. The periodic clock generating means 80 outputs a single periodic clock signal $T_{CLK}$ for each period that the wavelength of the laser beam L emitted from the light source unit is swept. The periodic clock generating means 80 comprises: an optical lens 81; an optical lens 83; an optical filter 82; and a photodetecting section 84. The laser beam L emitted form the optical fiber FB1c enters the optical filter 82 via the optical lens 81. The laser beam L which is transmitted through the optical filter 82 is detected by the photodetecting section 84 via the optical lens 83. Then, the periodic clock signal $T_{CLK}$ is output to the A/D converting unit 90.

Figure 10:
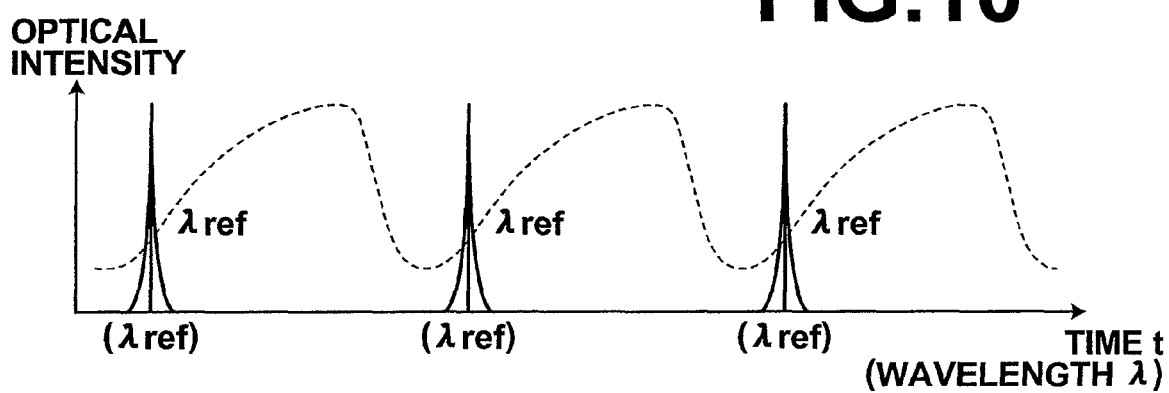
FIG. 10 is a graph that illustrates an example of periodic clock signals generated by the periodic clock generating means of FIG. 9.

The optical filter 82 is constituted by an etalon that transmits only a set wavelength λref, which is within the range of the wavelength band λmin to λmax and cuts off light having all other wavelengths, for example. Accordingly, the periodic clock signal $T_{CLK}$ is output when the laser bema L, of which the wavelength is periodically swept, is emitted from the light source unit 30, and the wavelength of the laser beam L becomes the set wavelength λref, as illustrated in FIG. 10.

By generating and outputting the periodic clock signal $T_{CLK}$ employing the laser beam L which is actually emitted from the light source unit 30, interference signals IS of a wavelength band during a predetermined period T (refer to FIG. 4) after the set wavelength λref can be obtained, even in the case that the amount of time that the laser beam L reaches a predetermined optical intensity after wavelength sweeping is initiated for each period of wavelength sweeping. Accordingly, the periodic clock signals $T_{CLK}$ can be output at timings for obtaining interference signals IS at a wavelength band which is expected by the tomographic image processing means 100, and deterioration of the resolution of tomographic images can be suppressed.

Particularly, if the set wavelength λref is a wavelength λref which is emitted a predetermined amount of time Tref after wavelength sweeping is initiated, obtainment of tomographic images using the laser beam L immediately after wavelength sweeping is initiated, when fluctuations are most likely to occur in the properties of the laser beam L, can be prevented. Thereby, deterioration in the resolution of tomographic images can be prevented.

FIG. 11 is a block diagram that illustrates the construction of a preferred embodiment of the tomographic image processing apparatus (tomographic image processing means) of the present invention. The tomographic image processing apparatus 100 (tomographic image processing means) will be described with reference to FIG. 11. Note that the configuration of the optical tomographic image processing apparatus 100 illustrated in FIG. 11 is realized by executing a tomographic image processing program, which is read out form an auxiliary memory device, on a computer (such as a personal computer). At this time, the tomographic image processing program may be distributed being recorded in recording media such as CD-ROM's, or via a network such as the Internet, and installed in the computer.

The tomographic image processing means 100 comprises: an interference signal converting means 101; an interference signal dividing means 102; an interference signal analyzing means 103; a tomographic data obtaining means 104; and a tomographic image generating means 105. The interference signal converting means 101 obtains interference signals IS corresponding to a single period from the interference signal storing means 94, using the periodic clock signal $T_{CLK}$ as a reference, and converts the interference signals IS such that they are arranged equidistant from each other along the axis of wave numbers k (k=2Π/λ). Note that the details of the signal converting method are disclosed in the specification of U.S. Pat. No. 5,956,355.

Figure 12A:
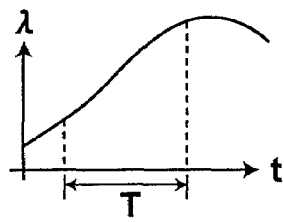
FIGS. 12A, 12B, and 12C are diagrams that schematically illustrate the manner in which interference signals are converted by a signal converting means of FIG. 11.
Figure 12B:
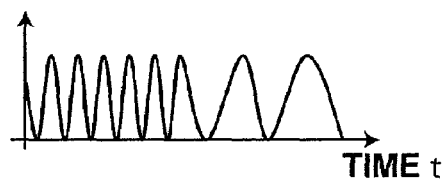
Figure 12C:
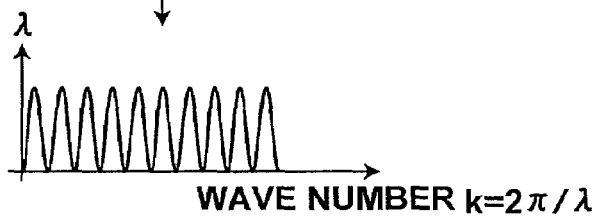
Figure 13A:
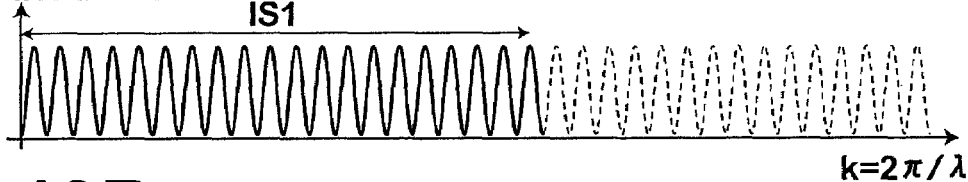
FIGS. 13A, 13B, 13C, and 13D are graphs that illustrate how a plurality of interference signals are obtained by an interference signal dividing means of FIG. 11.
Figure 13B:
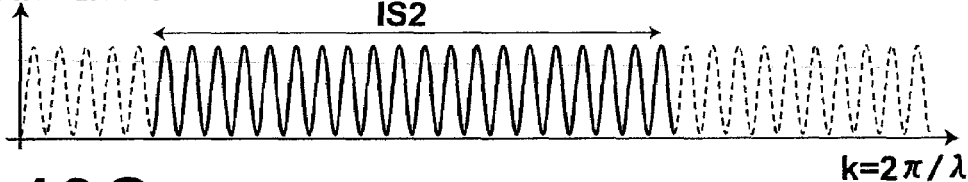
Figure 13C:
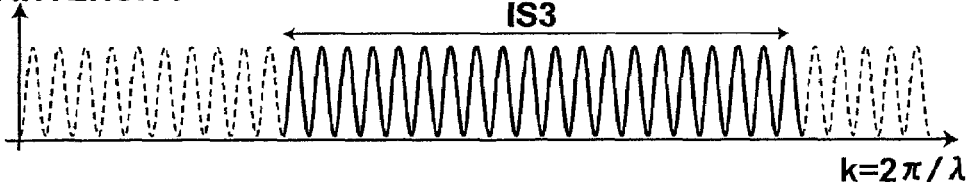
Figure 13D:
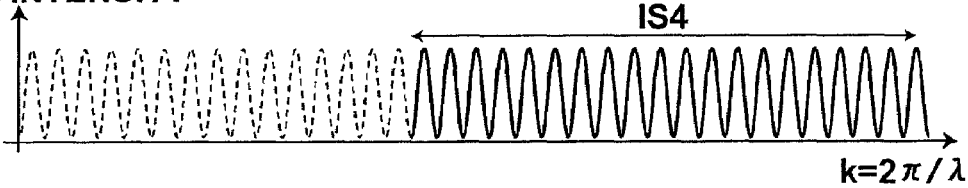

Specifically, wavelength sweeping property data that illustrate the relationship between time and wavelength within the period T (refer to FIG. 4) are recorded in the interference signal converting means 101, as illustrated in FIG. 12A. The interference signal converting means 101 obtains the interference signals IS as optical intensities over time, as illustrated in FIG. 12B. Then, the wavelength at each point in time is determined, based on the wavelength sweeping property data illustrated in FIG. 12A. Thereafter, the interference signal converting means 101 rearranges the data string such that the interference signals IS represent optical intensities with respect to changes in wave numbers k (k=2Π/λ), as illustrated in FIG. 12C. Thereby, high resolution tomographic images P can be obtained by spectral analysis that assumes that the interference signals IS are arranged equidistantly, such as Fourier transform and the maximum entropy method, when calculating tomographic data from the interference signals IS.

Note that in FIGS. 12A, 12B, and 12C, the interference signals IS are illustrated as the waveform of a component corresponding to a certain depth within the measurement target S, to simplify the description. In actuality, however, the interference signals IS are of a waveform in which the waveforms of components corresponding to a plurality of depth positions are overlapped.

The interference signal dividing means 102 of FIG. 11 divides the interference signals IS, which are detected when the laser beam L is emitted, into divided interference signals IS1 through IS4, each corresponding to a different wavelength band. Specifically, the interference signal dividing means 102 divides the interference signals IS obtained while the measuring light beam L1 is irradiated on a portion of the measurement target S for one period of wavelength sweeping, as illustrated in FIG. 12C, into four divided interference signals IS1 through IS4, each corresponding to a different wavelength band, as illustrated in FIG. 13. At this time, the interference signal dividing means 102 generates the divided interference signals IS1 through IS4 such that the wavelength bandwidths thereof are substantially uniform, and such that the wavelength bands overlap.

The interference signal analyzing means 103 analyzes each of the plurality of divided interference signals IS1 through IS4, and obtains tomographic data regarding each depth position within the measurement target S as intermediate tomographic data r1(z) through r4(z). The interference signal analyzing means 103 may comprise a first interference signal analyzing means 103a through a fourth interference signal analyzing means 103d, for spectrally analyzing the divided interference signals IS1 through IS4, respectively.

Figure 14:
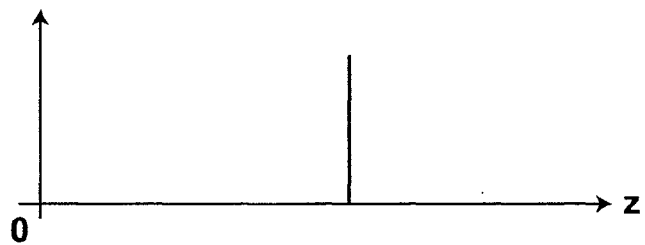
FIG. 14 is a graph that illustrates an example of intermediate tomographic data obtained from a specific depth position by an interference signal analyzing means of FIG. 11.
Figure 15A:
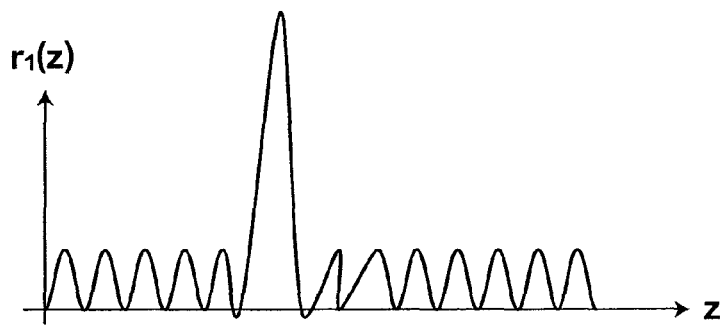
FIGS. 15A, 15B, 15C, and 15D are graphs that illustrate examples of a plurality of pieces of intermediate tomographic data obtained by the interference signal analyzing means of FIG. 11.
Figure 15B:
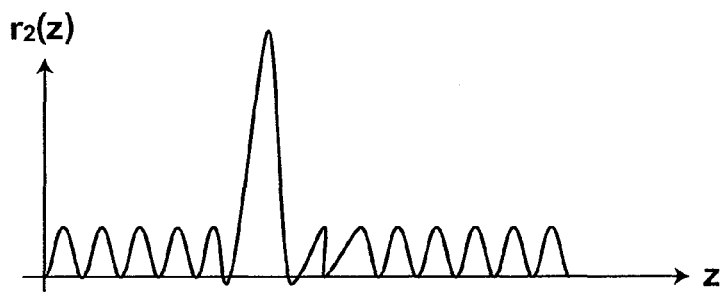
Figure 15C:
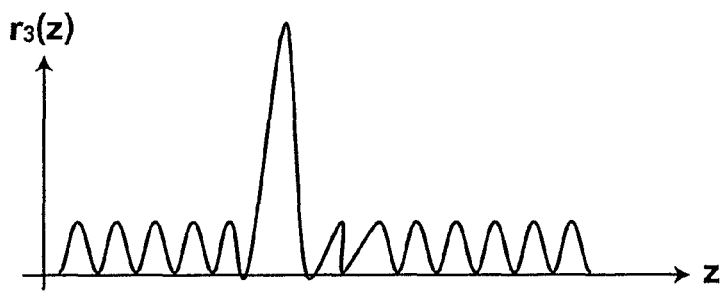
Figure 15D:
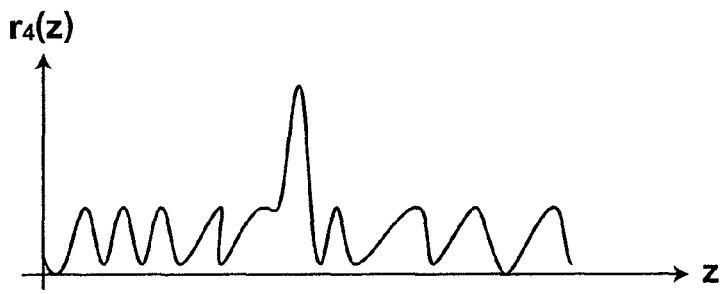

Each of the interference signal analyzing means 103a through 103d employs known spectral analysis techniques, such as the Fourier transform process, the Maximum Entropy Method (MEM), and the Yule-Walker method, to successively obtain tomographic data (reflectance) as illustrated in FIG. 14, for each depth position within the measurement target S. Then, The interference signal analyzing means 103a through 103d calculate intermediate tomographic data r1(z) through r4(z) for each depth position within a predetermined range, as illustrated in FIGS. 17A through 17D.

Here, because each of the divided interference signals IS1 through IS4 are generated so as to have a substantially uniform wavelength bandwidth, the interference signal analyzing means 103a through 103d may employ the same algorithm to analyze each of the divided interference signals. Therefore, spectral analysis of the divided interference signals can be performed efficiently.

Further, the wavelength bands of the divided interference signals IS1 through IS4 overlap, as illustrated in FIGS. 13A through 13D. Therefore, the occurrence of wavelength bands at which interference does not occur can be prevented. Accordingly, the intermediate tomographic data r1(z) through r4(z) for each depth position can be calculated accurately.

The tomographic data obtaining means 104 of FIG. 11 obtains the plurality of pieces of intermediate tomographic data r1(z) through r4(z) calculated by the interference signal analyzing means 103, to obtain tomographic data r(z), which is employed to generate a tomographic image. Specifically, the tomographic data obtaining means 104 calculates an average value of the plurality of pieces of intermediate tomographic data r1(z) through r4(z), to obtain the tomographic data r(z). For example, in the case that tomographic data r(z1) for a depth position z1 is to be obtained, an average value is calculated for the intermediate tomographic data r1(z1) through r4(z1). That is, the tomographic data r(z1)={r1(z1)+r2(z1)+r3(z1)+r4(z1)}/4. The tomographic data r(z) for each depth position is obtained by performing the above calculations for the intermediate tomographic data regarding each depth position.

Figure 16:
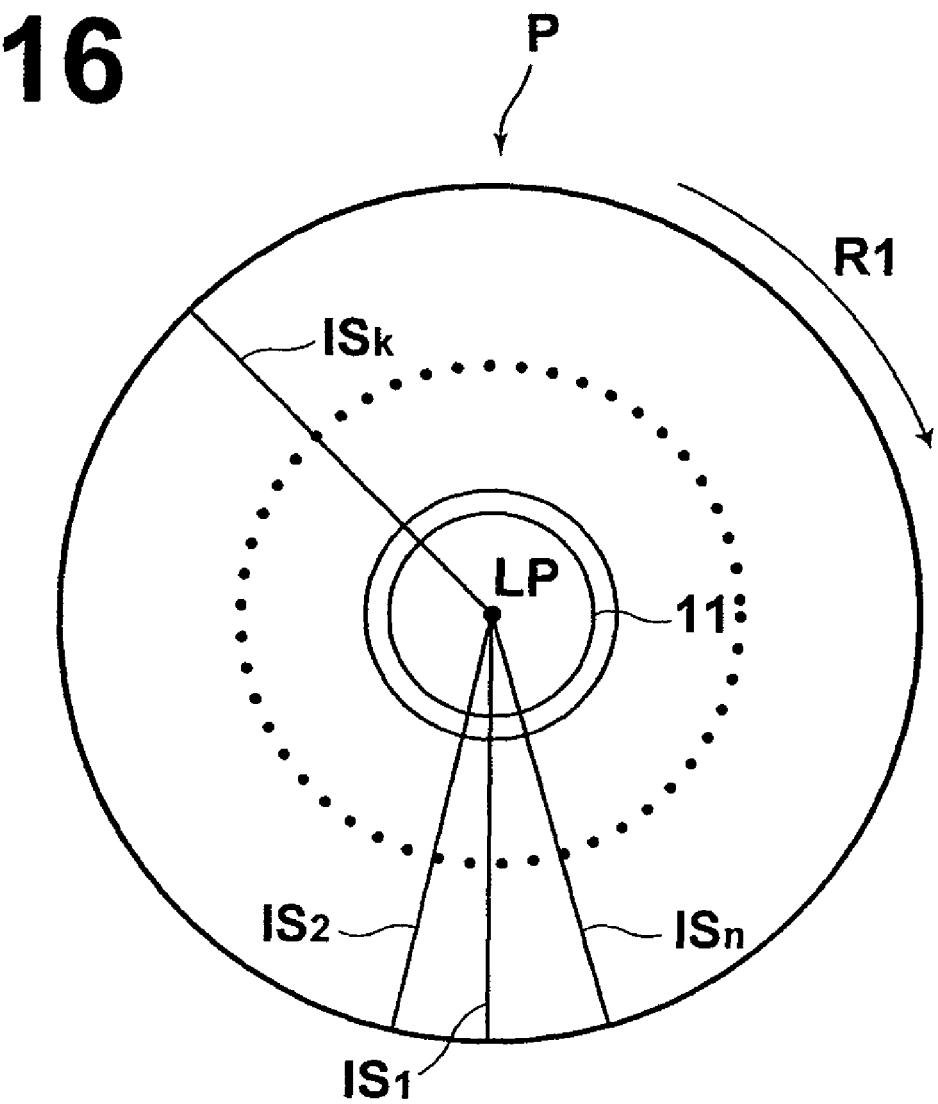
FIG. 16 is a schematic diagram that illustrates an example of a tomographic image generated by a tomographic image generating means of FIG. 11.

The tomographic image generating means 105 stores the tomographic data r(z) obtained by the tomographic data obtaining means 104 from the interference signals IS corresponding to one period of wavelength sweeping in a tomographic data accumulating means 105a, as tomographic data r(z) corresponding to one line. In this manner, the tomographic image generating means 105 stores a plurality of pieces of tomographic data r(z), which are obtained sequentially when the measuring light beam L1 is scanned and irradiated onto the measurement target S by the optical probe 10 of FIG. 1. When the rotation controlling means 10B outputs the rotational clock signal $R_{CLK}$, a tomographic image P is generated, using the tomographic data r(z) corresponding to the n lines which are accumulated in the tomographic data accumulating means 105a, as illustrated in FIG. 16. For example, in the case that the periodic clock signal $T_{CLK}$ is output from the light source unit 30 at 20 kHz, and the rotational clock signal $R_{CLK}$ is output from the rotation controlling means 10B at 20 Hz, the tomographic image generating means 105 generates the tomographic image P with 1024 pieces of tomographic data corresponding to n=1024 lines.

The plurality of pieces of intermediate tomographic data r1(z) through r4(z) are obtained from the plurality of divided interference signals IS1 through IS4 in this manner. Thereby, noise is reduced, increases in side lobes and artifacts are prevented, and the resolution of the tomographic image P is improved.

Figure 17A:
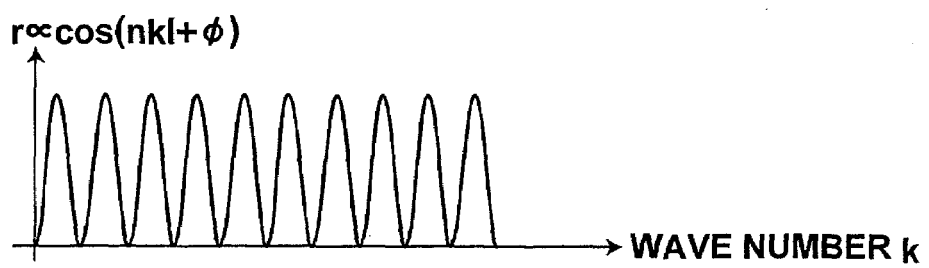
FIGS. 17A and 17B are graphs that illustrate the manner in which tomographic data is obtained from interference signals.
Figure 17B:

That is, the optical path difference between the reflected light beam L3 and the reference light beam L2 is encoded at a one to one relationship with the wavelength (frequency) of the interference signal in OCT measurement. Accordingly, tomographic data regarding the depth positions within the measurement target S can be obtained as illustrated in FIG. 17B, by spectrally analyzing the interference signals IS in a wave number k space, as illustrated in FIG. 17A, by Fourier transform or the like.

Figure 18A:
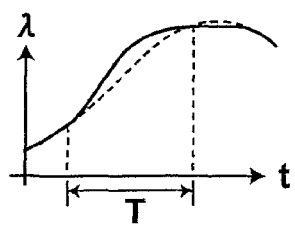
FIGS. 18A, 18B, 18C, and 18D are graphs that illustrate an example of a case in which resolution deteriorates, even if an interference signal converting means converts interference signals.
Figure 18B:
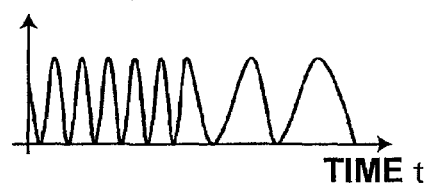
Figure 18C:
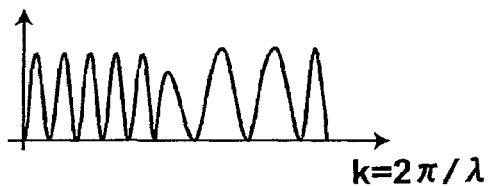
Figure 18D:
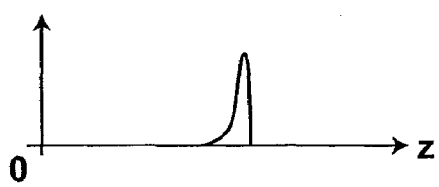

However, there are cases in which the interference signals IS are not rearranged equidistant from each other with respect to wave numbers k, due to fluctuations in swept wavelengths or due to the wavelength dependent properties of various optical components which are utilized in the optical tomography system 1. For example, assume that wavelength sweeping, which is shifted from assumed wavelength sweeping properties (indicated by the broken line of FIG. 18A) is performed due to the influence of an operating environment, and that interference signals IS such as those illustrated in FIG. 18B are obtained at a specific depth position within the measurement target S. In this case, even if the interference signal converting means 101 converts the interference signals IS, it is not possible for the interference signals to be rearranged such that they are equidistantly arranged with respect to wave numbers k, and the converted interference signals IS will appear as illustrated in FIG. 18C. Accordingly, when the interference signal analyzing means 103 analyzes the converted interference signals IS, tomographic data having a peak only at the specific depth position cannot be obtained, and the obtained tomographic data will appear as illustrated in FIG. 18D. This causes deterioration in the resolution of tomographic images.

Particularly in SS-OCT measurement, which is a representative form of FD-OCT measurement, the interference signals IS have the characteristic that a signal component from any wavelength band include tomographic data regarding all depth positions. This characteristic is utilized, and the divided interference signals IS1 through IS4 are generated from the interference signals IS corresponding to a single period. The plurality of pieces of intermediate tomographic data r1(z) through r4(z) are generated from the divided interference signals IS1 through IS4. Noise components caused by the fluctuation in wavelength sweeping, which are included in all of the pieces of intermediate tomographic data r1(z) through r4(z), are canceled out, thereby improving the resolution. In addition, it is not necessary to irradiate the measurement target S with the measuring light beam L1 for a plurality of periods of wavelength sweeping to obtain the divided interference signals IS1 through IS4. Therefore, high resolution tomographic images P can be obtained at high speed, which is advantageous, particularly when the tomographic images P are displayed in a video format.

Further, noise components due to the wavelength dependent properties of the optical components of the interferometer 20, such as optical fibers, and due to the wavelength scattering properties and the like of the measurement target S can also be removed, to improve the resolution of tomographic images. For example, there are cases in which optical fibers have different optical path lengths for each wavelength band. The differences in optical path lengths appear as shifts between the wavelengths of the laser beam L emitted from the light source 30 over time, and the wavelengths of the interference light beam L4 detected by the interference light detecting means 70 over time. Further, there are cases in which measurement targets S, such as living tissue, have wavelength scattering properties, and the aforementioned shifts occur due to these wavelength scattering properties as well. Accordingly, there are cases in which the interference signal converting means 101 only rearranging the interference signals based on the wavelength sweeping properties of the light source unit 30 cannot rearrange the interference signals to be equidistant from each other with respect to the wave numbers k. In addition, it is difficult to be aware of all uncertain elements present within the optical tomography system 1 and measurement targets S.

On the other hand, the tomographic data obtaining means 104 of FIG. 11 obtains the tomographic data r(z) employing the plurality of intermediate tomographic data r1(z) through r4(z), which are obtained from the same portion of the measurement target S. Therefore, noise components caused by the wavelength dependent properties of optical components and the wavelength scattering properties of the measurement target S, which are included in all of the pieces of intermediate tomographic data r1(z) through r4(z), are canceled out, thereby improving the resolution.

Note that in the embodiment described above, the tomographic data obtaining means 104 obtains the tomographic data r(z) by averaging the intermediate tomographic data r1(z) through r4(z). However, the present invention is not limited to this configuration, and alternate methods maybe employed to obtain the tomographic data.

For example, an average value $r_{ave}$ of the intermediate tomographic data r1(z) through r4(z) may be calculated. Then, an average value of the pieces of intermediate tomographic data excluding the piece of intermediate tomographic data having the furthest value from the average value (for example, r4(z)) may be calculated and designated as the tomographic data r(z). In this case, r(z)={r1(z)+r2(z)+r3(z)}/3. In the case that the fluctuation in wavelength sweeping, the wavelength dependent properties of optical components, or the wavelength scattering properties of the measurement target S is particularly great in a specific wavelength band (in this example, the wavelength band included in the divided interference signal IS4), the tomographic data r(z) can be obtained employing the intermediate tomographic data r1(z) through r3(z), excluding the intermediate tomographic data r4(z) obtained from this wavelength band. Thereby, the resolution of the tomographic image can be improved further.

Alternatively, a function may be employed that weights each piece of the intermediate tomographic data such that the weighting is greater the closer the value of the intermediate tomographic data is to the average value $r_{ave}$, to obtain the tomographic data. Specifically, the tomographic data obtaining means 104 may calculate an average value $r_{ave}$ of the intermediate tomographic data r1(z) through r4(z). Then, a weighting function g(x) may be employed to calculate the tomographic data according to the following Formula (1):

$$r(z) = \sum_i r_i g(r_i - r_{ave}) \quad (1)$$

wherein i=1, 2, 3, 4 (the number of divided interference signals).

Here, the weighting function g(x) is defined as:

$$g(x) = (|x|^P + \epsilon)^{-1}$$

wherein ϵ is a coefficient. Therefore, intermediate tomographic data $r_i$ having greater distances ($r_i - r_{ave}$) from the average value $r_{ave}$ are multiplied by smaller weighting functions g(x), and weighted addition is performed, according to Formula (1).

As a further alternative, the tomographic data obtaining means 104 may calculate the average value $r_{ave}$ and a variance σ of the intermediate tomographic data r1(z) through r4(z). Then, pieces of intermediate tomographic data $r_i$ having a difference from the average value $r_{ave}$ smaller than the variance σ may be extracted from among the intermediate tomographic data r1(z) through r4(z). The extracted intermediate tomographic data $r_i$ may be used to obtain the tomographic data r(z). Specifically, the weighting function g(x) shown below may be employed in Formula (1).

$$g(x) = \begin{cases} 1, & \text{if } |x| < c\sigma \\ 0, & \text{otherwise} \end{cases} \quad (2)$$

Note that σ in Formula (2) represents the variance $\{\sigma^2 = \Sigma(r_i - r_{ave})^2\}$, and c is an adjusting coefficient. In this case, weighted addition is performed using only pieces of intermediate tomographic data $r_i$ having values close to the average value, in Formula (1).

In the case that the fluctuation in wavelength sweeping, the wavelength dependent properties of optical components, or the wavelength scattering properties of the measurement target S is particularly great in a specific wavelength band (in this example, the wavelength band included in the divided interference signal IS4), the tomographic data r(z) can be obtained employing the intermediate tomographic data r1(z) through r3(z), excluding the intermediate tomographic data r4(z) obtained from this wavelength band by these methods as well. Thereby, the resolution of the tomographic image can be improved further.

Figure 19:
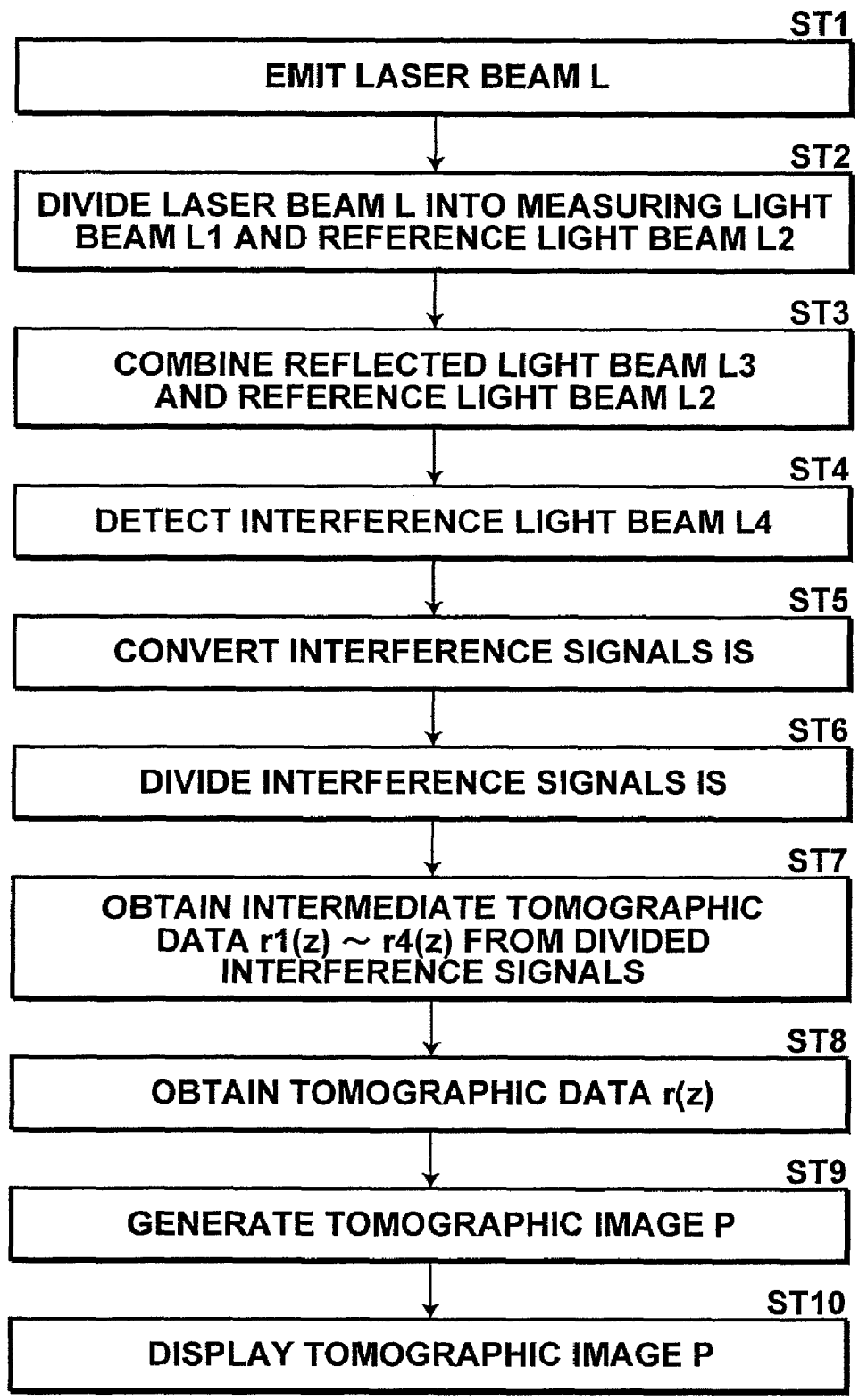
FIG. 19 is a flow chart that illustrates a preferred embodiment of the tomographic image processing method of the present invention.

FIG. 19 is a flow chart that illustrates a preferred embodiment of the tomographic image processing method of the present invention. The operation of the optical tomography system 1 will be described with reference to FIG. 1 through FIG. 19. First, the laser beam L, the wavelength of which is swept within a predetermined wavelength band at a predetermined period, is emitted from the light source unit 30 (step ST1). The laser beam L is divided by the light dividing means 2, and the two divided light beams enter the interferometer 20 and the periodic clock generating means 80, respectively. The laser bema L that enters the interferometer 20 is divided into the measuring light beam L1 and the reference light beam L2 by the light dividing means 3 (step ST2). The measuring light beam L1 is emitted toward the optical fiber FB2, and the reference light beam L2 is emitted toward the optical fiber FB3.

The measuring light beam L1 propagates through the optical circulator 21, the optical fiber FB4, and the optical probe 10, and is irradiated onto the measurement target S. The reflected light beam L3, which is reflected at each depth position z within the measurement target S, as well as back-scattered light, reenters the optical probe 10. The reflected light beam L3 enters the combining means 4, via the optical probe 10, the optical circulator 21, and the optical fiber FB5.

Meanwhile, the reference light beam L2 enters the optical path length adjusting means 40 via the optical fiber FB3, the optical circulator 22, and the optical fiber FB6. The reference light beam L2, of which the optical path length has been adjusted by the optical path length adjusting means 40, propagates through the optical fiber FB6, the optical circulator 22, the polarization controller 50, and the optical fiber FB7, to enter the combining means 4.

The combining means 4 combines the reflected light beam L3 and the reference light beam L2 (step ST3). The interference light beam L4 formed by the combining means 4 is divided by the optical dividing means 5, and the two interference light beams L4a and L4b are emitted toward the optical fiber FB8 and the optical fiber FB9, respectively. The interference light beams L4a and L4b which have propagated through the optical fibers FB8 and FB9 are attenuated by the variable optical attenuators 60A and 60B, and are detected by the interference light detecting means 70 (step ST4).

Here, the variable optical attenuators 60A and 60B are provided to attenuate the first interference light beam L4a and the second interference light beam L4b at different attenuation rates for each wavelength band such that the optical intensities thereof become substantially uniform across all wavelength bands. Thereby, non-interference components can be positively removed prior to the balanced detection performed by the interference light detecting means 70, and the S/N ratio can be improved.

The interference light beam L4 detected by the interference light detecting means 70 are output as interference signals IS. The interference signals IS are input to the A/D converting unit 90 via the amplifier 74 ad the signal band filter 75. Thereafter, the interference signals IS are converted into digital signals by the A/D converting unit 90, and stored in the interference signal storing means 94.

When the wavelength of the laser beam L that enters the periodic clock generating means 80 from the light source unit 30 via the light dividing means 2 is λref, the laser beam L which passes through the optical filter 82 and the optical lens 83 is detected by the photodetecting section 84. Then, the periodic clock generating means 80 outputs the periodic clock signal $T_{CLK}$ to the signal converting means 101, and the signal converting means 101 obtains the interference signals IS corresponding to one period, from among the interference signals IS stored in the interference signal storing means 94.

The interference signal converting means 101 of the tomographic image processing means 100 administers a signal conversion process on the interference signals IS corresponding to a single line, such that the interference signals IS become equidistant from each other with respect to wave numbers k (step ST5, refer to FIG. 12). The converted interference signals IS are divided into a plurality of divided interference signals IS1 through IS4, by the interference signal dividing means 102 (step ST6, refer to FIG. 13). Thereafter, the interference signal analyzing means 103 spectrally analyzes the divided interference signals IS1 through IS4, to obtain tomographic data (reflectance) regarding each depth position within the measurement target S, as intermediate tomographic data r1(z) through r4(z) (step ST7, refer to FIG. 14).

The tomographic data obtaining means 104 obtains tomographic data r(z) to be utilized to form a tomographic image, employing the intermediate tomographic data r1(z) through r4(z). Specifically, the tomographic data r(z) are obtained by calculating average values of the intermediate tomographic data r1(z) through r4(z), for example (step ST8). Tomographic data r(z) corresponding to n lines along the scanning direction (the direction of arrow R1) of the measuring light beam L1 are accumulated in the tomographic image generating means 105. Then, when the rotational clock signal $R_{CLK}$ is detected, the accumulated plurality of pieces of tomographic data r(z) are employed to generate a single tomographic image P (step ST9). Thereafter, an image quality correcting means 106 performs correction of image quality on the generated tomographic image P, and the corrected tomographic image P is displayed by the display device 110 (step ST10, refer to FIG. 16).

According to the embodiment described above, the plurality of divided interference signals IS1 through IS4 are obtained. Each of the plurality of divided interference signals IS1 through IS4 is spectrally analyzed to obtain a plurality of pieces of tomographic data regarding each depth position of the measurement target, as intermediate tomographic data r1(z) through r1(4). The tomographic data r(z) regarding the measurement target S are obtained employing the plurality of pieces of intermediate tomographic data. Then, the tomographic image P of the measurement target S is generated employing the obtained tomographic data r(z). Thereby, the influence of fluctuations in the wavelength of the emitted light beam can be minimized by obtaining the tomographic data employing the plurality of intermediate tomographic data, even in the case that the fluctuations occur and the wavelength band of the actual emitted light beam is shifted from the wavelength band of the interference signals expected by the tomographic image processing means. Accordingly, the resolution of the tomographic image can be improved.

In FD-OCT measurement, the interference signals IS have the characteristic that a signal component from any wavelength band include tomographic data regarding all depth positions. This characteristic is utilized, and the divided interference signals IS1 through IS4 are generated from the interference signals IS corresponding to a single period, as illustrated in FIG. 13. Therefore, it is not necessary to irradiate the measurement target S with the measuring light beam L1 for a plurality of periods of wavelength sweeping to obtain the divided interference signals IS1 through IS4. Therefore, high resolution tomographic images P can be obtained at high speed, which is advantageous, particularly when the tomographic images P are displayed in a video format.

The interference signal dividing means 102 divides the interference signals IS1 through IS4 such that the wavelength bandwidths of each divided interference signal are substantially uniform. Therefore, the same algorithm may be employed to analyze each of the divided interference signals, and the analysis of the divided interference signals IS1 through IS4 can be performed efficiently.

Further, the interference signal dividing means 102 divides the interference signals IS1 through IS4 such that the wavelength bands of the divided interference signals overlap. Thereby, the occurrence of wavelength bands which are not analyzed can be prevented, and the resolution of the generated tomographic image can be further improved.

The tomographic data obtaining means 104 obtains the tomographic data by calculating an average value of the plurality of pieces of intermediate tomographic data r1(z) through r4(z). Therefore, noise components and the like, which are included in each of the divided interference signals IS1 through IS4, can be cancelled out, to improve the resolution of the generated tomographic image P.

Alternatively, the tomographic data obtaining means 104 may obtain the tomographic data by: calculating an average value of the plurality of intermediate tomographic data; excluding the intermediate tomographic data having the furthest value from the average value; and recalculating an average value of the remaining intermediate tomographic data. As another alternative, the tomographic data obtaining means 104 may obtain the tomographic data by: calculating an average value of the plurality of intermediate tomographic data; and weighting each piece of the intermediate tomographic data such that the weighting is greater the closer the value of the intermediate tomographic data is to the average value. In these cases as well, noise components and the like, which are included in each of the divided interference signals IS1 through IS4, can be cancelled out, and the resolution of the generated tomographic image P can be improved. Particularly in the case that a divided interference signal corresponding to a specific wavelength band includes a large noise component, the intermediate tomographic data that includes the large noise component can be excluded when obtaining the tomographic data r(z). Thereby, the resolution of the generated tomographic image can be improved further.

The interference signal converting means 101 converts the interference signals IS so as to correspond to changes in wave numbers when the wavelength of the laser beam L is swept. Therefore, when conversion is performed into interference signals IS corresponding to changes in wave numbers for spectral analysis, the conversion can be performed based on the wavelength sweeping properties of the light source unit 30. Accordingly, the resolution of the generated tomographic image can be improved.

The present invention is not limited to the embodiment described above. For example, a case has been described in which the interference signal dividing means 102 of FIG. 11 divides the interference signals IS into four divided interference signals IS1 through IS4, as illustrated in FIG. 13. However, the number of divided interference signals is not limited to four, and any number greater than one may be adopted.

As illustrated in FIG. 13, the interference signal dividing means 102 generates the divided interference signals IS1 through IS4 by dividing the interference signals IS which have been converted by the interference signal converting means 101. Alternatively, the interference signal dividing means 102 may divide the interference signals IS first, then the interference signal converting means 101 may convert the divided interference signals IS1 through IS4. Thereafter, the tomographic data obtaining means 104 may obtain the tomographic data r(z) from the intermediate tomographic data r1(z) through r4(z).

The optical probe 10 of FIG. 2 irradiates the measuring light beam L1 while scanning the measuring light beam L1 in the circumferential direction thereof (the direction of arrow R1). Alternatively, the measuring light beam L1 may be irradiated onto the measurement target S while being scanned in the longitudinal direction of the optical probe 10. In this case, the optical fiber 12 and the optical lens 15 are of a configuration that enables movement with respect to the probe outer cylinder 11 in the longitudinal direction of the optical probe 10.

In the embodiment described above, a case has been described in which the tomographic image processing apparatus 100 of FIG. 11 is applied to SS-OCT measurement. Alternatively, the tomographic image processing apparatus 100 may be applied to an optical tomography system that employs SD-OCT measurement. Note that the light source unit 130 illustrated in FIG. 20 emits a wide band low coherence light beam. The interference light beam L4 enters a diffraction grating element 172 via a lens 171 in an interference light detecting means 170. The diffraction grating element 172 spectrally decomposes the interference light beam L4 into a plurality of wavelength bands, and the spectrally decomposed interference light beams L4 are detected by a photodetecting section 174 constituted by a plurality of photodetecting elements (such as photodiodes) via a lens 173, as interference signals IS.

Figure 20:
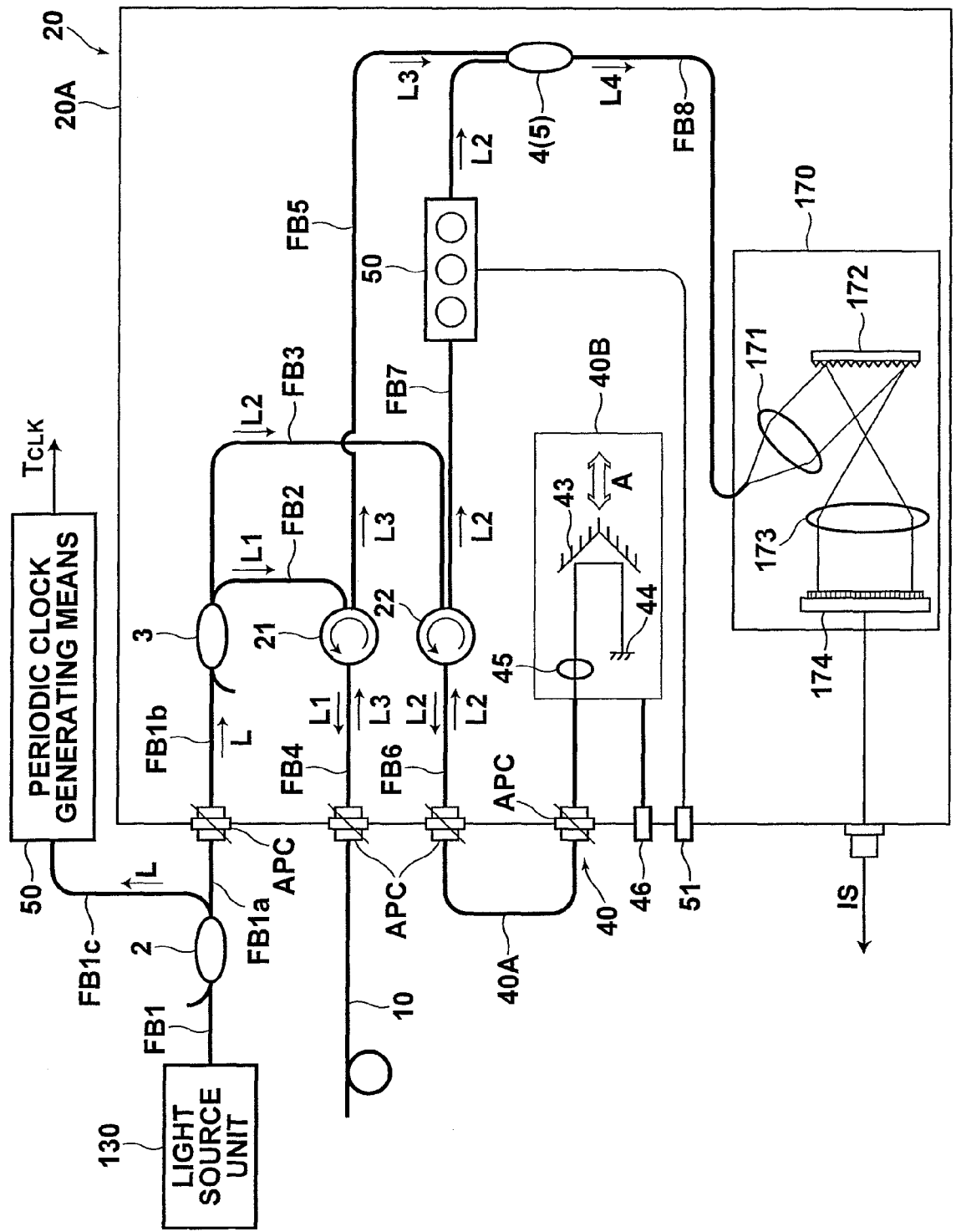
FIG. 20 is a diagram that illustrates the schematic construction of an optical tomography system according to another embodiment of the present invention.

As in optical tomography systems that employ SS-OCT measurement described above, there are cases in which noise components due to the wavelength dependent properties of optical components, such as the optical fibers employed in the interferometer 20, or noise components due to the wavelength scattering properties of the measurement target S are included in interference signals obtained by optical tomography systems that employ SD-OCT measurement, such as that illustrated in FIG. 20. Further, there is a problem unique to SD-OCT measurement, in that each detector of a detector array or the like that constitutes the photodetecting section 174 may have different wavelength detecting properties. Therefore, in the case that the interference signals IS are observed by the photodetecting section 174, a predetermined wavelength band of the interference light beam L4 does not appear linearly, due to the wavelength detecting properties of the detectors. Deterioration in resolution of tomographic images occurs in these cases as well.

Therefore, that the interference signals IS have the characteristic that a signal component from any wavelength band include tomographic data regarding all depth positions is utilized. The plurality of pieces of intermediate tomographic data r1(z) through r4(z), which are obtained from each divided interference signal IS1 through IS4, are employed to obtain the tomographic data r(z). Thereby, noise components, which are included in each piece of intermediate tomographic data r1(z) through r5(z) can be removed, and the resolution of the generated tomographic image can be improved.

What is claimed is:

1. A Fourier domain OCT tomographic image processing method, comprising the steps of:

emitting a light beam within a predetermined wavelength band;

dividing the emitted light beam in to a measuring light beam and a reference light beam;

combining reflected light beams, which are the measuring light beam reflected at various depth positions within a measurement target, with the reference light beam;

detecting interference light beams, formed by combining the reflected light beams and the reference light beam, as interference signals; and generating a tomographic image from the interference signals; wherein:

the detected interference signals are divided into different wavelength bands, to generate a plurality of divided interference signals;

each of the plurality of divided interference signals is analyzed to obtain a plurality of pieces of tomographic data regarding each depth position of the measurement target, as intermediate tomographic data;

tomographic data are obtained employing the plurality of pieces of intermediate tomographic data; and the tomographic image of the measurement target is generated employing the obtained tomographic data, wherein the light beam is emitted while the wavelength thereof is periodically swept within the predetermined wavelength band; and the plurality of divided interference signals are detected during a single period of the wavelength of the light beam being swept, and are divided into the divided interference signals for each of a plurality of different wavelength bands.

2. A Fourier-domain OCT tomographic image processing apparatus that emits a light beam within a predetermined wavelength band; divides the emitted light beam in to a measuring light beam and a reference light beam; combines reflected light beams, which are the measuring light beam reflected at various depth positions within a measurement target, with the reference light beam; detects interference light beams, formed by combining the reflected light beams and the reference light beam, as interference signals; and generates tomographic images from the interference signals; comprising:

interference signal dividing means, for dividing the detected interference signals into different wavelength bands, to generate a plurality of divided interference signals;

interference signal analyzing means, for analyzing each of the plurality of divided interference signals to obtain a plurality of pieces of tomographic data regarding each depth position of the measurement target, as intermediate tomographic data;

tomographic data obtaining means, for obtaining tomographic data employing the plurality of pieces of intermediate tomographic data; and tomographic image generating means, for generating the tomographic images of the measurement target employing the obtained tomographic data, wherein:

the light beam is emitted while the wavelength thereof is periodically swept within the predetermined wavelength band; and the interference signal dividing means generates the plurality of divided interference signals, by dividing the interference signals, which are detected during a single period of the wavelength of the light beam being swept, into the divided interference signals for each of a plurality of different wavelength bands.

3. A tomographic image processing apparatus as defined in claim 2, wherein:

the interference signal dividing means divides the interference signals such that the bandwidths of the divided interference signals are substantially uniform.

4. A tomographic image processing apparatus as defined in claim 2, wherein:

the interference signal dividing means divides the interference signals such that the wavelength bands of the divided interference signals overlap with each other.

5. A tomographic image processing apparatus as defined in claim 2, wherein:

the tomographic data obtaining means obtains the tomographic data by: calculating an average value of the plurality of intermediate tomographic data.

6. A tomographic image processing apparatus as defined in claim 2, wherein:

the tomographic data obtaining means obtains the tomographic data by: calculating an average value of the plurality of intermediate tomographic data; excluding the intermediate tomographic data having the furthest value from the average value; and recalculating an average value of the remaining intermediate tomographic data.

7. A tomographic image processing apparatus as defined in claim 2, wherein:

the tomographic data obtaining means obtains the tomographic data by: calculating an average value of the plurality of intermediate tomographic data; and weighting each piece of the intermediate tomographic data such that the weighting is greater the closer the value of the intermediate tomographic data is to the average value.

8. A tomographic image processing apparatus as defined in claim 2, wherein:

the tomographic data obtaining means obtains the tomographic data by: calculating an average value and a variance of the plurality of intermediate tomographic data; extracting intermediate tomographic data having a difference from the average value smaller than the variance; and employing the extracted tomographic data.

9. A tomographic image processing apparatus as defined in claim 2, further comprising:

interference signal converting means, for converting the interference signals or the divided interference signals so as to correspond to changes in wave numbers, when the wavelength of the light beam is swept.

10. A tangible computer readable medium, having recorded therein a Fourier-domain OCT tomographic image processing program, the program causing a computer to execute the procedures of:

emitting a light beam within a predetermined wavelength band;

dividing the emitted light beam in to a measuring light beam and a reference light beam;

combining reflected light beams, which are the measuring light beam reflected at various depth positions within a measurement target, with the reference light beam;

detecting interference light beams, formed by combining the reflected light beams and the reference light beam, as interference signals; and generating a tomographic image from the interference signals; wherein:

the detected interference signals are divided into different wavelength bands, to generate a plurality of divided interference signals;

each of the plurality of divided interference signals is analyzed to obtain a plurality of pieces of tomographic data regarding each depth position of the measurement target, as intermediate tomographic data;

tomographic data are obtained employing the plurality of pieces of intermediate tomographic data; and the tomographic image of the measurement target is generated employing the obtained tomographic data, wherein:

the light beam is emitted while the wavelength thereof is periodically swept within the predetermined wavelength band; and the plurality of divided interference signals are detected during a single period of the wavelength of the light beam being swept, and are divided into the divided interference signals for each of a plurality of different wavelength bands.

11. A Fourier-domain OCT optical tomography system, comprising:

a light source unit, for emitting a light beam within a predetermined wavelength band;

light dividing means, for dividing the emitted light beam in to a measuring light beam and a reference light beam;

combining means, for combining reflected light beams, which are the measuring light beam reflected at various depth positions within a measurement target, with the reference light beam;

interference light detecting means, for detecting interference light beams, formed by combining the reflected light beams and the reference light beam, as interference signals; and tomographic data processing means, for generating a tomographic image from the interference signals; wherein the tomographic data processing means comprises:

interference signal dividing means, for dividing the detected interference signals into different wavelength bands, to generate a plurality of divided interference signals;

interference signal analyzing means, for analyzing each of the plurality of divided interference signals to obtain a plurality of pieces of tomographic data regarding each depth position of the measurement target, as intermediate tomographic data;

tomographic data obtaining means, for obtaining tomographic data employing the plurality of pieces of intermediate tomographic data; and tomographic image generating means, for generating the tomographic images of the measurement target employing the obtained tomographic data, wherein:

the light source unit emits the light beam while sweeping the wavelength thereof within the predetermined wavelength band; and the interference signal dividing means generates the plurality of divided interference signals, by dividing the interference signals, which are detected during a single period of the wavelength of the light beam being swept, into the divided interference signals for each of a plurality of different wavelength bands.

12. A Fourier-domain OCT tomographic image processing method, comprising the steps of:

emitting a light beam within a predetermined wavelength band;

dividing the emitted light beam in to a measuring light beam and a reference light beam;

combining reflected light beams, which are the measuring light beam reflected at various depth positions within a measurement target, with the reference light beam;

detecting interference light beams, formed by combining the reflected light beams and the reference light beam, as interference signals; and generating a tomographic image from the interference signals; wherein:

the detected interference signals are divided into different wavelength bands, to generate a plurality of divided interference signals;

each of the plurality of divided interference signals is analyzed to obtain a plurality of pieces of tomographic data regarding each depth position of the measurement target, as intermediate tomographic data;

tomographic data are obtained employing the plurality of pieces of intermediate tomographic data; and the tomographic image of the measurement target is generated employing the obtained tomographic data, wherein:

the divided interference signals are divided such that the wavelength bands of the divided interference signals overlap with each other.

13. A Fourier-domain OCT tomographic image processing apparatus that emits a light beam within a predetermined wavelength band; divides the emitted light beam in to a measuring light beam and a reference light beam; combines reflected light beams, which are the measuring light beam reflected at various depth positions within a measurement target, with the reference light beam; detects interference light beams, formed by combining the reflected light beams and the reference light beam, as interference signals; and generates tomographic images from the interference signals; comprising:

interference signal dividing means, for dividing the detected interference signals into different wavelength bands, to generate a plurality of divided interference signals;

interference signal analyzing means, for analyzing each of the plurality of divided interference signals to obtain a plurality of pieces of tomographic data regarding each depth position of the measurement target, as intermediate tomographic data;

tomographic data obtaining means, for obtaining tomographic data employing the plurality of pieces of intermediate tomographic data; and tomographic image generating means, for generating the tomographic images of the measurement target employing the obtained tomographic data, wherein:

the interference signal dividing means divides the interference signals such that the wavelength bands of the divided interference signals overlap with each other.

14. A tangible computer readable medium, having recorded therein a Fourier-domain OCT tomographic image processing program, the program causing a computer to execute the procedures of:

emitting a light beam within a predetermined wavelength band;

dividing the emitted light beam in to a measuring light beam and a reference light beam;

combining reflected light beams, which are the measuring light beam reflected at various depth positions within a measurement target, with the reference light beam;

detecting interference light beams, formed by combining the reflected light beams and the reference light beam, as interference signals; and generating a tomographic image from the interference signals; wherein:

the detected interference signals are divided into different wavelength bands, to generate a plurality of divided interference signals;

each of the plurality of divided interference signals is analyzed to obtain a plurality of pieces of tomographic data regarding each depth position of the measurement target, as intermediate tomographic data;

tomographic data are obtained employing the plurality of pieces of intermediate tomographic data; and the tomographic image of the measurement target is generated employing the obtained tomographic data, wherein:

the divided interference signals are divided such that the wavelength bands of the divided interference signals overlap with each other.

15. A Fourier-domain OCT tomography system, comprising:

a light source unit, for emitting a light beam within a predetermined wavelength band;

light dividing means, for dividing the emitted light beam in to a measuring light beam and a reference light beam;

combining means, for combining reflected light beams, which are the measuring light beam reflected at various depth positions within a measurement target, with the reference light beam;

interference light detecting means, for detecting interference light beams, formed by combining the reflected light beams and the reference light beam, as interference signals; and tomographic data processing means, for generating a tomographic image from the interference signals; wherein the tomographic data processing means comprises:

interference signal dividing means, for dividing the detected interference signals into different wavelength bands, to generate a plurality of divided interference signals;

interference signal analyzing means, for analyzing each of the plurality of divided interference signals to obtain a plurality of pieces of tomographic data regarding each depth position of the measurement target, as intermediate tomographic data;

tomographic data obtaining means, for obtaining tomographic data employing the plurality of pieces of intermediate tomographic data; and tomographic image generating means, for generating the tomographic images of the measurement target employing the obtained tomographic data, wherein:

the interference signal dividing means divides the interference signals such that the wavelength bands of the divided interference signals overlap with each other.

* * * * *